United States Patent [19]

Takahashi et al.

[11] Patent Number: 5,212,472
[45] Date of Patent: May 18, 1993

[54] GAS DISCHARGE TYPE LIGHT EMISSION APPARATUS AND METHOD OF DRIVING THE SAME

[75] Inventors: Atsushi Takahashi; Hiroshi Furuya; Hideo Sawai; Mio Chiba; Yukio Nakamura; Masao Ikehata; Hiroshi Tohyama; Hiromi Takahashi; Yoshitaka Terao; Yuuji Terouchi, all of Tokyo, Japan

[73] Assignee: Oki Electric Industry Co., Ltd., Tokyo, Japan

[21] Appl. No.: 413,678

[22] Filed: Sep. 28, 1989

[30] Foreign Application Priority Data

Oct. 3, 1988 [JP] Japan ............... 63-247443
Nov. 21, 1988 [JP] Japan ............... 63-151555
Nov. 21, 1988 [JP] Japan ............... 63-151556

[51] Int. Cl.$^5$ ............................................. G09G 3/22
[52] U.S. Cl. ..................................... 340/771; 340/774
[58] Field of Search ............... 340/758, 771, 774, 773; 315/169.1, 169.4; 313/584, 586

[56] References Cited

U.S. PATENT DOCUMENTS 4,021,851  5/1977  Le Coquil et al. ............... 340/771
4,081,717  3/1978  Kaji et al. ...................... 315/169.4
4,303,917  12/1981  Kishino et al. ................... 340/758
4,529,909  7/1985  Kamegaya et al. ................. 313/584

Primary Examiner—Alvin E. Oberley
Assistant Examiner—Regina Liang
Attorney, Agent, or Firm—Wenderoth, Lind & Ponack

[57] ABSTRACT

A method is for driving a gas discharge type light emission apparatus having an electrode block line(s) constituted by electrode blocks. Scanning of adjacent cathodes, one being in one of two adjacent electrode blocks and the other being in the other electrode block, is effected such that subsequent to the scanning of one adjacent cathode, at least one cathode other than the other adjacent cathode is scanned prior to the scanning of the other adjacent cathode. By the method, crosstalk between adjacent electrode blocks is prevented without the provision of a partitioning member between the adjacent electrode blocks. A gas discharge type light emission apparatus includes an anode(s) on a front substrate and cathodes on a rear substrate. The anodes and cathodes face one another via a discharge gas medium to constitute discharge cells. The anodes are made of a light-blocking material and including windows at positions corresponding to the cathodes. The windows are also provided at positions corresponding to boundaries between adjacent anodes. By providing windows, discharge light emission having a clear shape and a high resolution can be obtained.

17 Claims, 37 Drawing Sheets

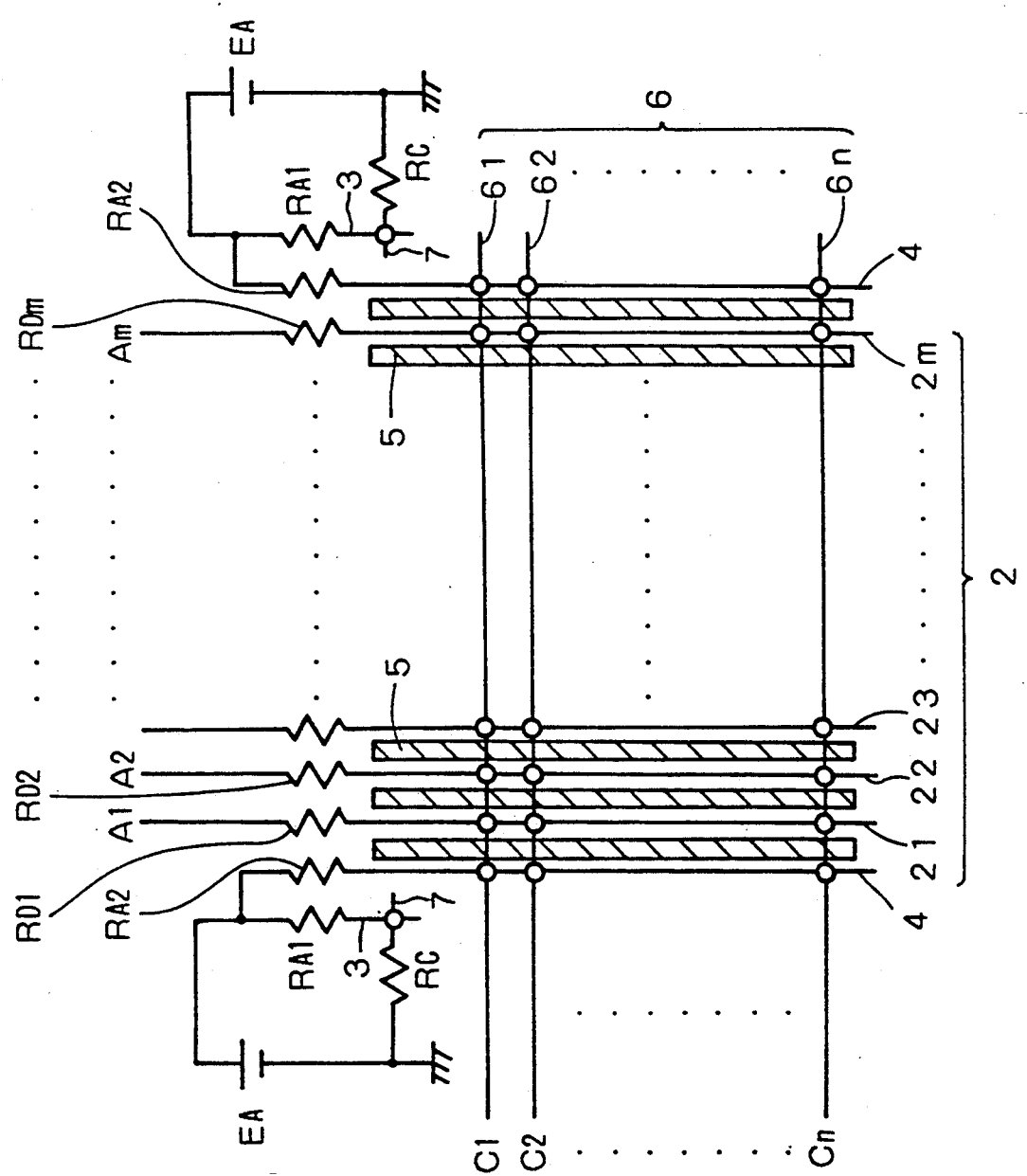
FIG._2

FIG_3
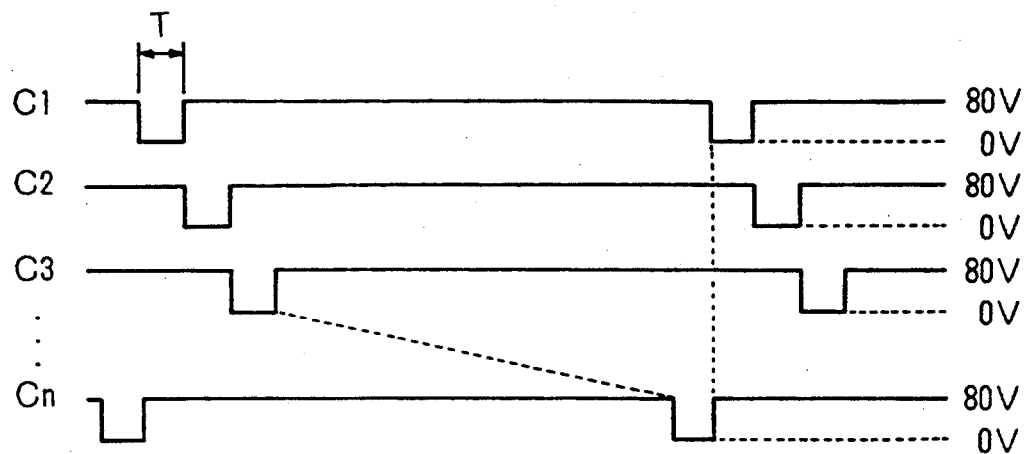
FIG_4
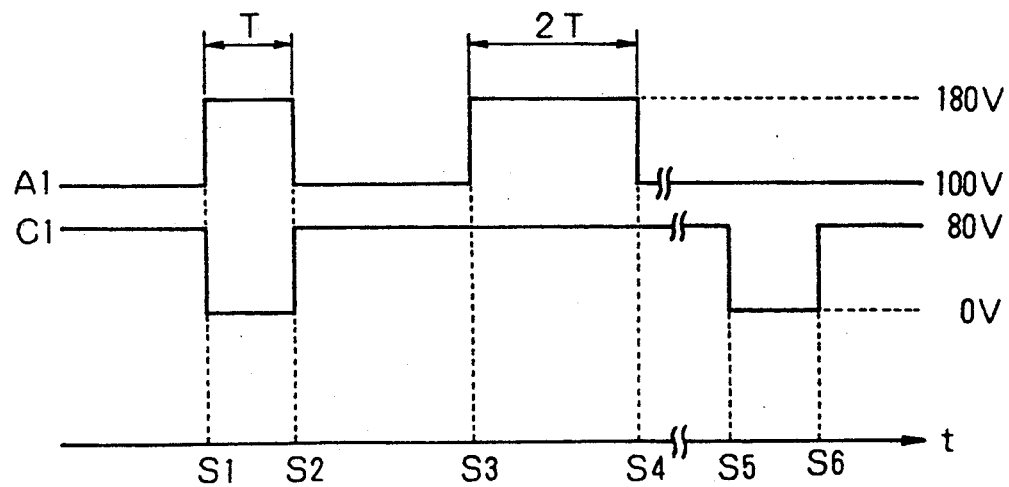

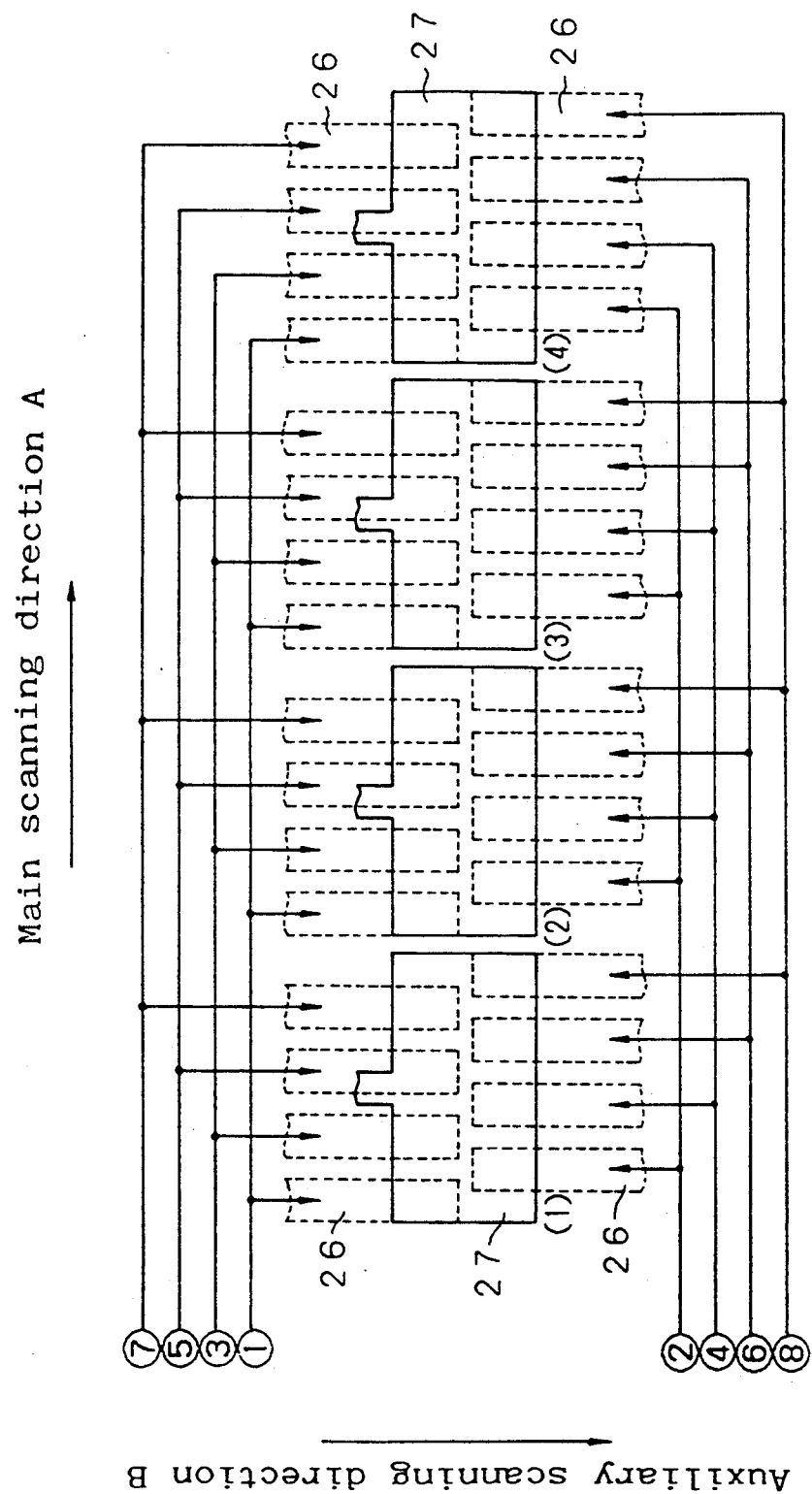

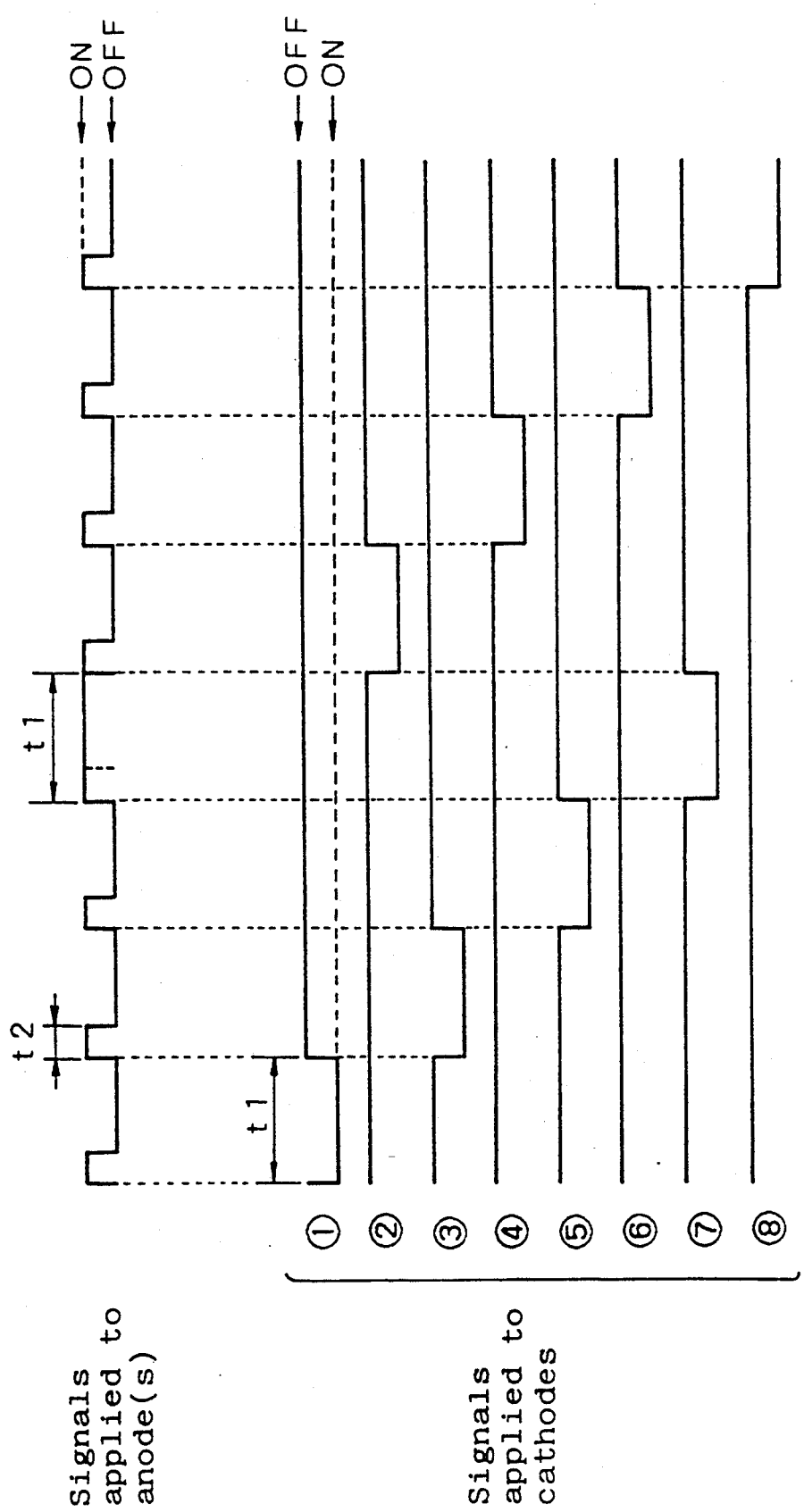

FIG_15
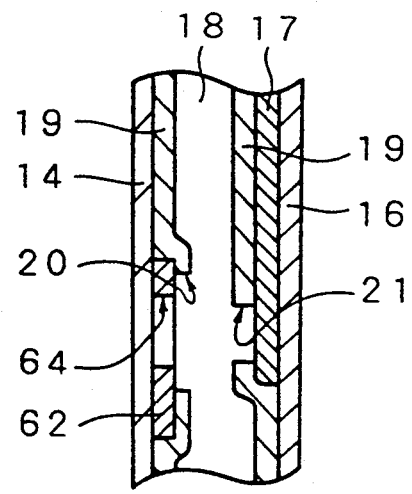
FIG_16
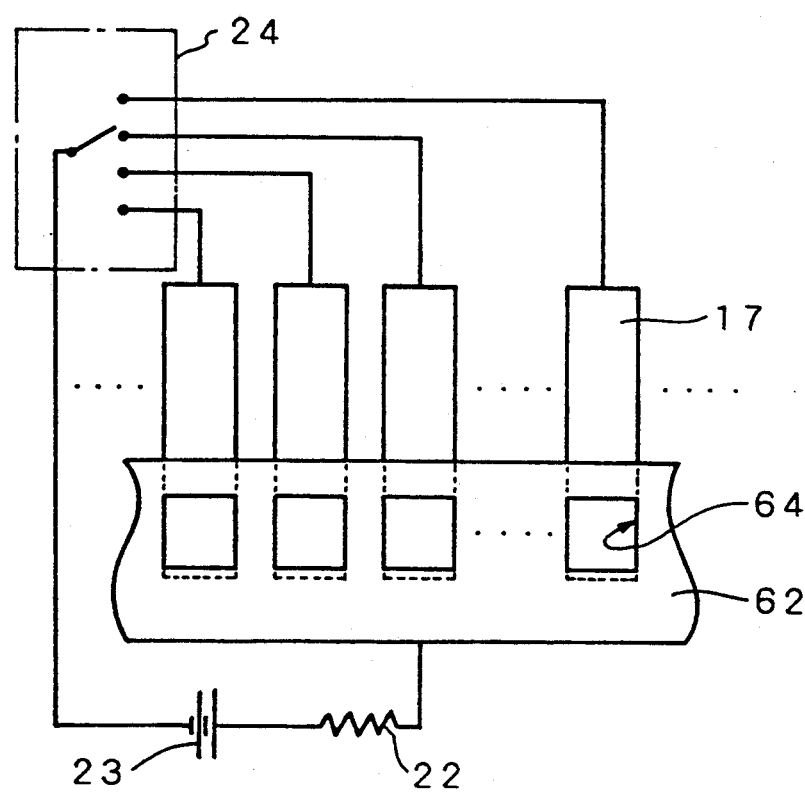

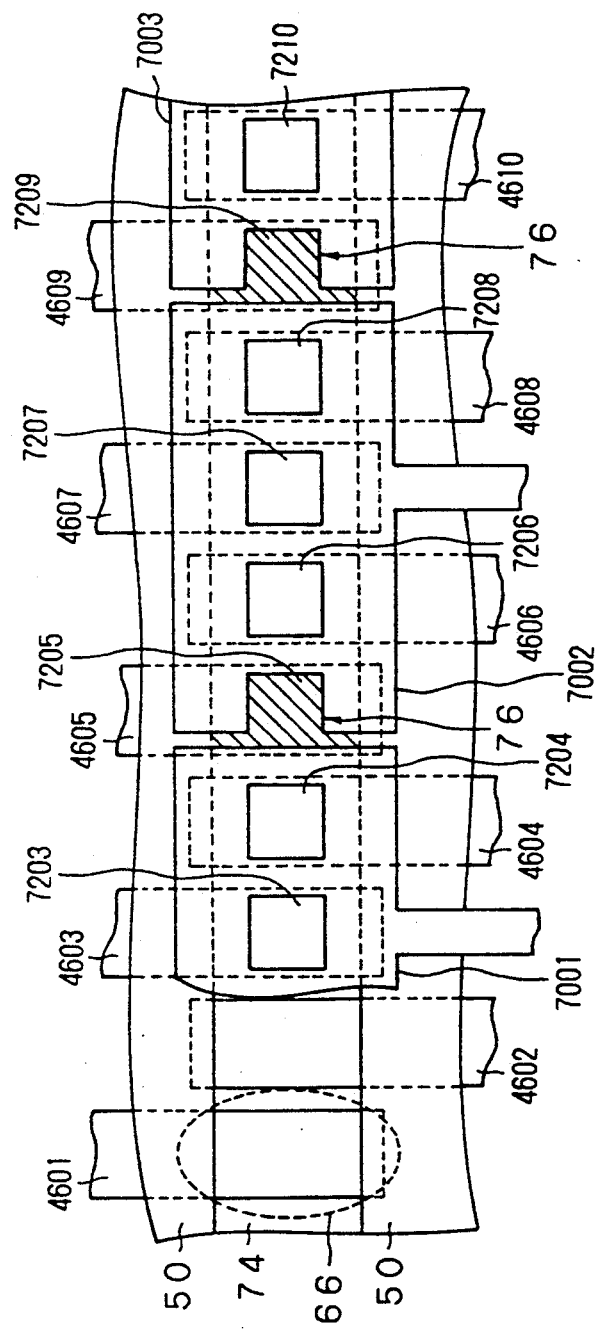
FIG._21

FIG_17
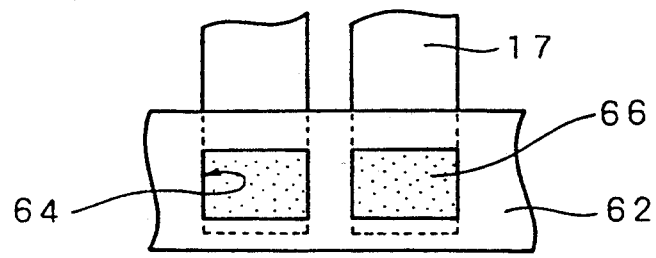
FIG_22(a)    FIG_22(b)
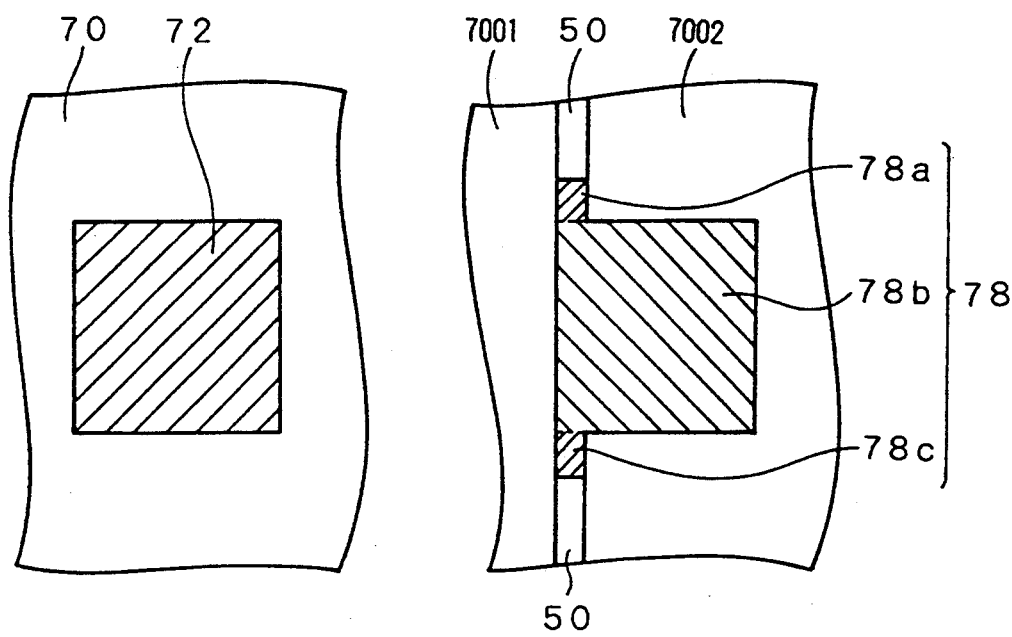

FIG._23
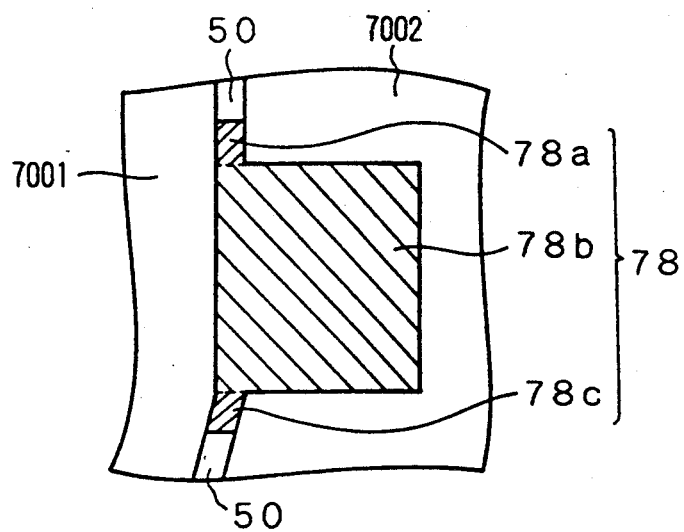
FIG._24
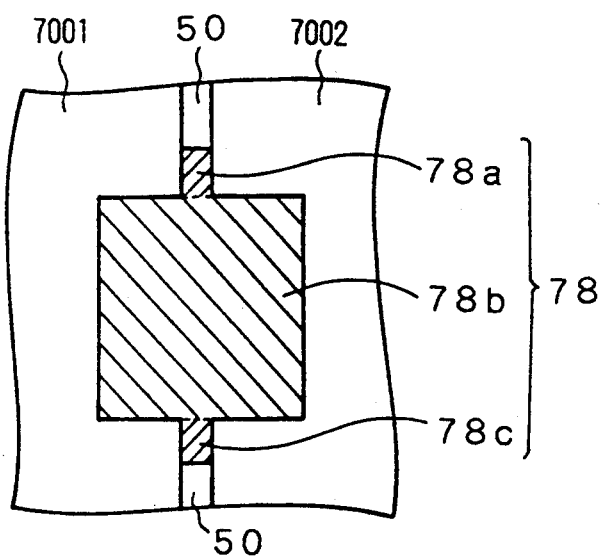
FIG._25
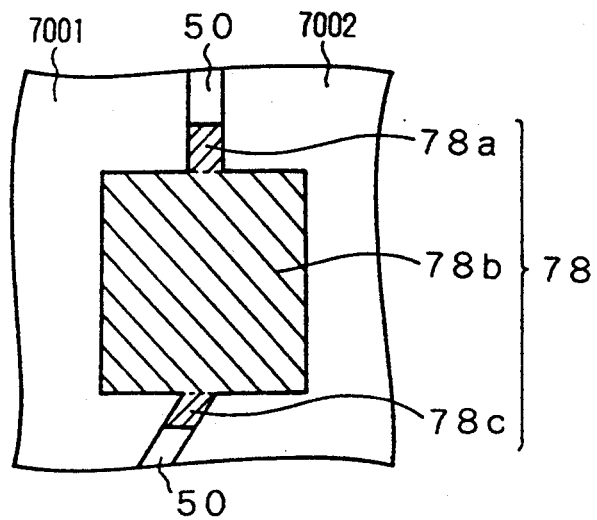

GAS DISCHARGE TYPE LIGHT EMISSION APPARATUS AND METHOD OF DRIVING THE SAME

BACKGROUND OF THE INVENTION

This invention relates to a gas discharge light emission (or generation) apparatus type utilizing light emitted (or generated) discharge as a source of light and a method of driving the same.

A plasma display panel (PDP) is known as gas discharge light emission apparatus.

There are AC and DC type PDPs, and various PDPs are disclosed in, for instance, a literature I entitled "Electronics Technology Series", No. 4, Latest Display Device/Apparatus Technology, 1985. As an example of a PDP, a DC type PDP disclosed in the Literature I will be described.

FIG. 1 is a perspective view, partly broken away, schematically showing the construction of the prior art DC type PDP. The illustrated prior art PDP has a rear substrate 1, on which are provided a plurality of ribbon-like anodes 2 and also DC and AC auxiliary anodes 3 and 4. These anodes extends parallel to one another, and partitioning members 5 are provided between adjacent anodes 2 to 4. The PDP further comprises a plurality of ribbon-like cathodes 6 and an auxiliary DC cathode 7. These regular and auxiliary cathodes 6 and 7 perpendicularly confront and are spaced apart from the regular and auxiliary anodes 2 to 4.

First discharge cells for display are formed in areas where the cathodes 6 intersect and confront the anodes 2. Second discharge cells for firing discharge display for the first discharge cells are formed in areas where the cathodes 6 intersect and confront the AC auxiliary discharge anode 4. Further, third discharge cells for firing discharge for the second discharge cells are formed in areas where the DC auxiliary discharge cathode 7 and DC auxiliary discharge anode 3 intersect and confront one another.

The cathodes 6 are formed at positions corresponding to the first discharge cells with small holes 8 as priming holes. Further, for reducing statistical delay for discharge in the discharge cells, ions and excited atoms generated as a result of firing discharge are supplied from the second discharge cells to the first discharge cells.

Further, for stabilizing light emission by discharge in the discharge cells, the anodes 2 are connected through resistors RD to data signal lines, the The DC auxiliary anode 3 is connected through a resistor RA1 to a power supply EA, the AC auxiliary anode 4 is connected through a resistor RA2 to the power supply EA, and the DC auxiliary cathode 7 is connected through a resistor RC to ground.

The PDP further comprises a front substrate 9. The front and rear substrates 9 and 1 are sealed together by a sealing section (not shown), thus sealing gas capable of discharge, for instance a gas mixture of Ne and Ar (referred to as discharge gas medium), between the substrates.

FIG. 2 shows a two-dimensional matrix wiring structure of this prior art DC type PDP. Referring to FIG. 2, a plurality of (i.e., m) anodes (generally designated at 2) are individually designated at 201, 202, . . . 2m, a plurality of (i.e., n) cathodes (generally designated at 6) are individually designated at 601, 602, . . . 6n, data signals supplied to the anodes 2 are designated at A1, A2, . . . , Am, and scanning signals supplied to the cathodes 6 are designated at C1, C2, . . . , Cn.

The data signals A1, A2, Am are supplied through resistors RD1, RD2, . . . , RDm to the anodes 2.

The circles shown in FIG. 2 designate discharge cells.

FIG. 3 shows scanning signals supplied to the cathodes, and FIG. 4 shows discharge light emission timings in the discharge cells FIG. 4 shows an example of waveforms of scanning signal and data signal. As shown in FIG. 3, the scanning signals C1 to Cn each consist of an "on" state (for instance 0-V voltage state) for emission of light in the discharge cells and an "off" state (for instance 80-V voltage state), provided by cathode pre-bias voltage $V_{Cpb}$, for extinguishing light in the discharge cells. The duration T of the "on" state constitutes a unit time. The "on" states of the individual scanning signals C1 to Cn are applied sequentially to the individual cathodes 601 to 6n (FIG. 2).

As shown in FIG. 4, the data signals (only data signal A1 being shown), like the scanning signals, each consist of an "on" state (for instance 180-V voltage state) and an "off" state (for instance 100-V voltage state) provided by anode pre-bias voltage $V_{Cpb}$. The duration T of the "on" state again constitutes a unit time. The data signals A1 to Am are applied to the respective anodes 201 to 2n (FIG. 2).

When displaying or printing characters or drawings with light emission in the discharge cells, the scanning signals C1 to Cn are sequentially applied to the cathodes 601 to 6n, thus sequentially turning on these cathodes (see FIGS. 2 and 3). The data signals A1 to Am are applied to the anodes 201 to 2n with their timings matched to the "on" state of the cathodes for causing selective light emission in the discharge cells. Thus, in a discharge cell, in which light is to be emitted, both the anode and cathode are turned on, and a voltage in excess of a discharge-starting voltage (for instance 130 V) is applied between the two electrodes. In a discharge cell, in which no light is to be emitted, on the other hand, both the anode and cathode are held "off", and a voltage lower than the discharge-starting voltage is applied between the two electrodes.

Referring now to FIGS. 4 and 2 as an example, during a period S1–S2, an "on" state scanning signal is applied to the cathode 601, an "off" state scanning signal is applied to the cathodes 602 to 6n, and an "on" state data signal is applied to the anode 201. Thus, in the discharge cell in the area of intersection between the cathode 601 and anode 201 light is emitted a by discharge, while no discharge light emission takes place in the discharge cells in the areas of intersection between the cathodes 602 to 6n and anode 201.

During periods S2 S3 and S5 S6, an "off" state data signal is applied to the anode 201. During this time, therefore, no discharge light emission is caused in the discharge cells in the areas of intersections between the anode 201 and cathodes 601 to 6n regardless of application of an "on" state scanning signal to the cathodes 601 to 6n.

During a period S3–S4, an "off" state scanning signal is applied to the cathode 601, while an "on" state data signal is applied to the anode 201. During this period, discharge light emission does not take place in the cell at the area of intersection between the cathode 601 and anode 201, but instead it takes place in the cells in the areas of intersections between the cathodes among cathodes 602 to 6n, an on which "on" state scanning signal prevails, and anode 201

It will be understood from the foregoing that and "off" state data signal may be applied to the anode 201 if light emission in the cells in the area of intersection between the anode 201 and cathodes 601 and 6n is not desired. In this case, if an "off" state data signal is applied to the adjacent anode 202, crosstalk (i.e., erroneous discharge) is caused between the anode 202 and cathodes among cathodes 601 to 6n facing the anodes 201 and 203, on which an "off" state scanning signal prevails. To prevent such crosstalk, the height of the partitioning members 5 is set to prevent erroneous discharge between adjacent anodes In the meantime, in the light emission by gas discharge, it is possible to select a wavelength range suited to wavelength sensitivity characteristics of various photosensitive medium by appropriately selecting the composition of the sealed gas. For this reason, it is thought to utilize PDP or like gas discharge type light emission devices as optical heads of electrographic (i.e., optical) printers The prior art structure of such a prior art gas discharge type discharge head will now be described briefly.

FIG. 5 shows a main wiring of a prior art gas discharge type optical head (also referred to as optical print head).

In this illustrated of gas discharge type, optical head a plurality of, i.e., eight, anodes 1001 to 1008 are provided on one of the pair substrates in a row extending in a main scanning direction, and also a plurality of, i.e., 64, cathodes 1101, 1102, . . . , 1164 are provided in parallel to one another on the other substrate. The two substrates are sealed together in a spaced-apart relation to each other such that the anodes and cathodes perpendicularly cross one another, and discharge gas is sealed between the substrates.

Each anode is common to a suitable number of (for instance eight) cathodes, and this electrode set (for instance the anode 1001 and cathodes 1101 to 1108) constitutes an electrode block A plurality of electrode blocks are arranged side by side in the scanning direction to constitute an electrode block line.

On the other substrate (not shown) noted above are further provided a plurality of, i.e., eight, scanning electrodes 1201 to 1208. The cathodes and scanning electrode are connected to one another such that like cathodes in the individual blocks are connected only to a corresponding scanning line, for instance the cathodes 1101 to 1164 are commonly connected to the scanning electrode 1201. Matrix connection by multi-layer wiring thus is provided. With this construction, discharge light emission can be caused independently for each block.

Data signals A1 to A8 are applied through resistors R1 to R8 to the anodes 1001 to 1008, and scanning signals C1 to C8 are applied to the scanning electrodes 1201 to 1208. Light emission is caused in the discharge cells, in which both the input signals are in the "on" state. For preventing crosstalk, partitioning member 12 are provided between adjacent electrode blocks (i.e., adjacent anodes).

In a display, the picture element density may be 3 dots/mm. In the optical head, however, the picture element density is desired to be as high as 8 to 16 dots/mm. To meet such a high picture element density requirement, the inter-electrode distance between adjacent electrodes should be small. Partitioning members are formed by thick film printing techniques. However, it is very difficult to form partitioning members in narrow inter-electrode spaces as noted above such that they have a height which is sufficient to prevent erroneous discharge and such that they are accurately positioned. At any rate, inferior yield and high cost are inevitable. Without any partitioning member, however, crosstalk occurs.

Now, a prior art plasma light emission electrode structure constructed as an optical head will be described.

FIG. 6 is a schematic fragmentary sectional view showing a prior art plasma optical head.

In this prior art optical head, a single anode 15 is formed on a substrate 14, while a plurality of parallel cathodes 17 are formed on another substrate 16. These substrates 14 and 16 are sealed together with lead glass or a like sealing agent such that their electrode formation sides face each other. A narrow space 18 is formed between the substrates 14 and 16 sealed together, and rare gas mainly composed of Ne (sealed gas) is sealed in the space. Insulating films 19 are formed on &he electrode formation sides for restricting light emission areas More specifically, they have apertures or windows 20 and 21 exposing corresponding portions of the anode 15 and cathodes FIG. 7 schematically shows mainly the positional relation between the anode and cathodes of this prior art optical head As is shown, the parallel cathodes 17 face the stripe-like anode 15 at a predetermined distance therefrom, thus forming respective discharge cells.

The anode 15 is connected through a resistor 22 to the positive potential side of a high voltage power supply 23 at $+V$ (of 180 to 220 V), and the cathodes 17 are connected through a driver circuit 24 to the negative potential side (0 V) of the power supply 23. By selectively applying a voltage between the anode 15 and cathodes 17, discharge light emission is caused in the discharge cells constituted by the selected ones of electrodes 15 and 17.

FIGS. 8(a) to 8(c) are views for explaining light emission areas (also referred to as light emission section). In these figures, light emission areas 25 are shown with scattered dots. In the case of FIG. 8(a), the electrodes 15 and 17 are made of a non-transparent metal electrode. Since the electrodes 15 and 17 are overlapped in the direction of taking out light, discharge light has to be taken out from the edge of the anode 15. In other words, at the time of light emission, light in a portion of the light emission area 25 that is not concealed by the anode 15 is taken out.

In the case of FIG. 8(b), the anode 15 is a transparent electrode. In this case, the light emission area 25 is not concealed by the anode 15. Therefore, light can be taken out from the entire light emission area 25.

In the case of FIG. 8(c), adjacent light emission areas 25 partly overlap each other.

With the above plasma light emission apparatus constructed as an optical head, however, if the anode 15 and cathodes 17 are non-transparent electrodes (FIG. 8(a)), light is taken out from only a portion of each light emission area 25. Actually, only about 50% of the total amount of light emitted in the light emission area 25 is taken out from the area.

Where the anode 15 is a transparent electrode, the amount of light taken out from the light emission area 25 can be increased. However, the light emission area of discharge light emission formed in the neighborhood of the cathode is wider in plan view than the cathode, and this means an increase of the print dot size. In addition, when the picture element density is increased, the light emission area 25 of adjacent discharge cells are liable to partly overlap each other in plan view. That is, adjacent light dots are not definitely separated, so that a clear print can not be obtained. To avoid partial overlap of light from adjacent light emission area 25, the cathodes 17 have to be spaced apart sufficiently Doing so, however, imposes a limitation on the resolution of the optical head.

Further, in a plasma light emission apparatus constructed as a two-dimensional display, like the optical head (optical printing head), a reduction of the amount of taken-out light is liable to occur, or an overlap of light from adjacent light emission areas imposes a limitation on the resolution. Further, in the case of a two-dimensional display where partitioning members are provided around individual discharge cells to prevent the spread of light from each light emission area, although overlap of light can be prevented by the partitioning members, the partitioning members themselves limit the picture element density.

Now, a prior art method of driving a plasma optical head having two rows of discharge cells will be described. In the optical head, two cathode rows each consisting of a plurality of cathodes are provided for each anode such that one row of cathodes is deviated by one-half pitch relative to the other row of cathodes in the direction of rows.

FIG. 9 schematically shows the electrode structure and circuit wiring of a prior art plasma line head (optical head) Referring to FIG. 9, the width direction of a photosensitive medium is a main scanning direction A, and a direction of movement of the photosensitive medium is a auxiliary scanning direction B. Symbols ① to ⑧ designate respective eight cathodes groups (of four cathodes each), into which the cathodes are divided by multi-layer wiring. The cathodes (generally designated at 26) in the same group are electrically connected together.

In this example, four anodes (generally designated at 27) are provided such that each is common to eight cathodes 26, i.e., to one cathode each of the eight cathodes groups ① to ⑧. Four electrode blocks are thus provided. A discharge cell as a print cell is formed at each of the areas where the anodes 27 and cathodes 26 confront one another. In this example, the print cells are arranged in a staggered fashion in the auxiliary scanning direction B.

Symbols (1) to (4) are ordinal numbers of the anodes 27, and hence electrode blocks, given sequentially in the main scanning direction A.

FIG. 10 is a timing chart for explaining the method of driving the plasma line head having the above construction.

This method is a cathode eight-division driving method. The cathodes 26 are divided by multi-layer wiring into eight groups, and a voltage is applied sequentially to the cathode groups in the order of ①, ③, ⑤, ⑦, ②, ④, ⑥, ⑧, ①, ... for a pulse period t1 as unit time, during which the scanning signal is in the "on" state, for each cathode group.

Meanwhile, a voltage is applied for pulse period t1 to anodes among the anodes 27 corresponding to print cells, in which light emission is to be caused, in synchronism with the timing of scanning of the cathodes 26.

Slight light emission pulse t1 is also applied at all time to the anodes 27 in synchronism with the timing of scanning of the cathodes 26. In this way, an effect of priming for light emission is obtained without any auxiliary electrode.

The phase "effect of priming" denotes an effect provided by a light emission element, in which there is or was discharge light emission, to reduce a discharge start voltage and delay time in the discharge start in its own or in the next light emission element to cause light emission.

FIG. 11 is a circuit diagram of the driver circuit.

Anode data 29 is supplied to a shift register 28. The anode data covers several anodes, and after its input the output of the shift register 28 is supplied to a latch 30, and substantially simultaneously the output is supplied to an anode driver 31 for conversion to a high or low voltage, which is supplied as print information to print cells (discharge cells) 32.

Cathode data 33 on the cathode side is supplied to a shift resister 34, and a waveform for eight cathode groups is sequentially passed through a cathode driver 35 for conversion to a high or low voltage supplied to the print cells 32.

Slight light emission pulse t2 is supplied from a direct set terminal 36 to the anode driver 31. If the signals from the direct set terminal 36 and latch 30 are ORed, the voltage of slight light emission pulse t2 may be applied when no printing is done, and the voltage of light emission pulse t1 when printing is done.

As soon as anode data 29 is completely shifted to the latch 30, next anode data 29 turns to be supplied to the shift register 34. For supplying data to the shift register 34 or latch 30, anode clock 38 and latch clock 38 are used. Cathode clock 39 has a like function.

With the above construction and method of driving discharge light emission is caused in print cells, in which the light emission pulse t1 prevails on anode 27 and cathode 26 simultaneously, and the photosensitive medium is generated by the emitted light.

At this time, discharge light emission is caused in current print cells 32 for slight light emission pulse t2 to provide a priming effect to the next print cells to cause discharge light emission In this way, the priming effect is shifted progressively.

The deterioration of contact of print due to discharge light emission for slight light emission pulse t2 can be sufficiently accommodated in a permissible contract range by minimizing the slight light emission pulse.

While the prior art plasma discharge light emission apparatus is described in connection with a plasma line head, the prior art plasma display panel utilizes discharge cells of a driving method like that for the plasma line head as light emission elements, and hence display cells.

Like the case of the plasma line head, the cathodes are scanned by sequentially applying a light emission pulse signal to them, while a light emission pulse signal based on light emission/non-emission data is selectively applied to the anodes in synchronism with the timing of the cathode scanning, thus effecting matrix driving of the display cells.

Further, to provide a priming effect a slight light emission pulse signal is applied to the anodes in synchronism with the cathodes scanning timing.

In the above prior art driving method, however, the priming effect is received irregularly because of zig-zag sequence of cathode driving.

More specifically, there are cases of unnecessary shift and failure of necessary shift of the priming effect. To describe the former case in detail, it is assumed that a light emission mode is set in a print cell (1)-(8) constituted by the anode number (1) and cathode group 8 in FIG. 9 so that light emission pulse is applied to the anode 27 of anode number (1) and cathodes 26 in the cathode group (8), and in the next cycle the light <mission mode is set in print cell (1) (1) but not in print cell (2) - (1), that is, a light emission pulse is applied to the anode 27 of anode number (1) and to cathodes 26 in the cathodes group (1) but not applied to the anode 27 of the anode number (2). In this case, light emission is caused for the light emission pulse period in the print cell (2) - (1) which is not in the light emission mode. This takes place because the priming effect of the cathode in the print cell (1) - (8) causes discharge light emission between the anode 27 of the anode number (1) and cathode in the print cell (2) - (1).

As the latter case, the priming effect is considered, which is provided by light emission for the slight light emission pulse period in, for instance, print cell (1) - (7). This priming effect is to be received by the print cell (2) - (2). However, since the print cells (1) - (7) and (2) - (2) are distant from each other, a failure of a sufficient shift of priming effect is liable to occur, resulting in a failure of the light emission. This also applies to the relation between the print cells (2) - (7) and (3) - (2).

As has been shown, in the prior art, erroneous discharge and failure of discharge are prone, deteriorating the print quality in the case of the plasma line head and deteriorating the display quality in the case of the PDP.

Further, the prior art plasma line head has the following problems.

Dots printed by print elements are spaced apart very finely in the direction of movement of photosensitive medium (e.g., in the auxiliary scanning direction B). Therefore, it is impossible to move the photosensitive medium in the form of a drum intermittently and accurately using a stepping motor after the end of printing of one line (i.e., printing of dots corresponding in number to 8 times the number of anodes) for the printing of the next line.

For this reason, in the above prior art driving method, driving of the print elements is effected as parallel driving for each anode from one end to the other end thereof, while rotating the photosensitive drum at a constant speed in the direction of auxiliary scanning. In this method, however, time corresponding to the number of provided light emission pulse cathode group is passed from the first printing till the last printing of one line. Therefore, there is produced between the result of print by the print cell (1) - (1) and that of the print cell (1) - (8), for instance, a step corresponding to the product of the time difference between the timing of light emission in the print cell (1) - (1) and that of subsequent light emission in the cell (1) - (8) and speed of movement of the photosensitive medium. As a result, a sawtooth-like print pattern is produced.

Because of the formation of such a sawtooth-like print pattern, in the case of characters where blank portions are defined by horizontal and vertical lines crossing one another such as Japanese characters, deterioration of the visual quality of printed characters is liable to occur.

SUMMARY OF THE INVENTION

The present invention is presented to solve various problems inherent in the prior art gas discharge light emission apparatuses and methods of driving such apparatuses as described above.

An object of the invention is to provide a gas discharge light emission apparatus and a method of driving the same, which can eliminate crosstalk between adjacent electrode blocks in an electrode block line without the provision of any partitioning member between adjacent electrode blocks.

Another object of the invention is to provide a gas discharge light emission apparatus, which permits a practically sufficient amount of light to be taken out from each light emission area and which can prevent overlap of light from adjacent light emission areas.

A further object of the invention is to provide a gas discharge light emission apparatus, which is simple in cathode structure, permits an increase of the integration density, permits clear light spots to be obtained with high resolution and without light intensity irregularities and is free from light spot pitch irregularities.

A still further object of the invention is to provide a gas discharge light emission apparatus, which can eliminate crosstalk, permits practically sufficient separation of light dots and permits an improvement of the yield.

A further object of the invention is of an optical print head, which uses either one of the above gas discharge light emission apparatuses.

A still further object of the invention is to provide a gas discharge light emission apparatus and a method of driving the same, which permit an improvement of the display quality in a plasma display panel and an improvement of the print quality in a plasma line head with a structure capable of preventing a shift of the priming effect in unnecessary directions and permitting reliable and sufficient shift of the priming effect between adjacent light emission elements.

According to one aspect of the present invention, a method is provided for driving a gas discharge type light emission apparatus comprising a plurality of electrode blocks arranged along a line, said electrode blocks each including one anode and a plurality of cathodes facing said anode via a discharge gas medium, discharge light emission being caused selectively between said anodes and cathodes by applying data signals to said anodes in said individual electrode blocks and scanning said cathodes belonging to said individual electrode blocks being using scanning signals, wherein:

referring to one and the other one of two adjacent electrode blocks as a first electrode block and a second electrode block, respectively, referring to an end cathode in said first electrode block and on the side of said second electrode block as a first cathode and referring to an end cathode in said second electrode block and on the side of said first electrode block as a second cathode, the scanning of said first and second cathodes is effected such that subsequent to the scanning of said first cathode one or more cathodes in said first or second electrode block and other than said second cathode prior to the scanning of said second cathode.

According to another aspect of the present invention, gas discharge type light emission apparatus is provided comprising a plurality of anodes provided on a front substrate and a plurality of cathodes provided on a rear substrate, said anodes and cathodes facing one another via a discharge gas medium to constitute a plurality of discharge cells, light emission being caused in said discharge cells by applying data signals to said anodes and applying scanning signals to said cathodes, wherein:

said anodes are made of a light-blocking material and formed at positions corresponding to said cathodes with light transmission windows.

In this gas discharge type light emission apparatus, light transmission windows are suitable arranged linearly in one or more rows.

Further, in the above gas discharge type light emission apparatus, said light transmission windows are suitably arranged in a zig-zag fashion.

Further, in the above gas discharge type light emission apparatus, said light transmission windows are suitably square in shape.

Further, in the above gas discharge type light emission apparatus, said light transmission windows are suitably constituted by thorough holes.

Further, in the above gas discharge type light emission apparatus, two or more anodes are are provided in a linear arrangement on said front substrate, a plurality of cathodes are provided such that they face each of said anodes, each said anode is provided at positions corresponding to said cathode with said windows, any of said windows that corresponds to a cathode facing the boundary or neighborhood thereof between two adjacent anodes is substantially defined by the opposed end portions of said two anodes, and the areas of said windows are made equal to an area of projection on an anode of an exposed image portion by a window.

Further, in the above gas discharge light emission apparatus, said windows are suitably square in shape, and said window defined by the opposed end portions of two adjacent anodes has one side substantially defined by an end of one of said anodes and the other sides substantially defined by the end portion of the other anode.

Further, in the above gas discharge type light emission apparatus, said window defined by the opposed end portions of two adjacent anodes is suitably square in shape, one of the halves of said window in the direction of arrangement of the cathodes is defined by an end portion of one of said two anodes, and the other half of said window is defined by the end portion of the other anode.

Further, in the above gas discharge type light emission apparatus, said windows provided in said anodes have an equal area.

Further, in the above gas discharge type light emission apparatus, two or more anodes are suitably provided in a linear arrangement on said front substrate, a plurality of cathodes are provided such that they face each of said anodes, one of two adjacent anodes is spaced apart from a cathode facing the other anode and nearest said one anode by a distance substantially sufficient to eliminate erroneous discharge, a floating electrode is interposed between said adjacent anodes, a window corresponding to a cathode facing the boundary or neighborhood thereof between said one anode and said floating electrode is substantially defined by opposed end portions of said one anode and floating electrode, and a window corresponding to a cathode facing the boundary or neighborhood thereof between said other anode and said floating electrode is substantially defined by the opposed end portions of said o&her anode and floating electrode.

Further, in the above gas discharge type light emission apparatus, the area of said windows are suitably made equal to an area of projection on an anode of an exposed cathode image portion by a window.

Further, in the above gas discharge type light emission apparatus, said windows are suitably square in shape, and said window defined by the opposed end portions of each of said two adjacent anodes and said floating electrode has one side substantially defined by the end of either of said each anode and floating electrode and the other sides substantially defined by the end portion of the other.

Further, in the above gas discharge type light emission apparatus, said window defined by the opposed end portions of said one anode and said floating electrode has one of its halves in the direction of arrangement of the cathodes defined by the end portion of said one end, and the other half of said window is defined by the end portion of said floating electrode, and said window defined by the end portion of said other anode and said floating electrode has one of its halves in the direction of arrangement of the cathodes defined by the end portion of said other anode, and the other half of said window is defined by the end portion of said floating electrode.

Further, in the above gas discharge type light emission apparatus, two or more anodes are suitably provided as said anodes in a linear arrangement, cathodes arranged in two rows extending in the direction of arrangement of the anodes face each of said anodes, each cathodes in one of said rows of cathodes is located at a position corresponding to mid way between adjacent cathodes in the other row of cathodes, windows provided for the cathodes in one of said rows and windows provided for the cathodes in the other row are arranged such that the distance between them in a direction perpendicular to the direction of arrangement of the anodes becomes smaller as one goes along the direction of arrangement of the anodes from one side to the other side, the rate reduction of distance being equal to a distance covered by a medium light emitted from said discharge cells during a period of a unit "on" state of scanning signals applied to said cathodes.

According to a further aspect of the present invention, there is provided a method of driving a gas discharge type light emission apparatus comprising the steps of:

scanning a plurality of cathodes facing each of a plurality of anodes and arranged in two rows by applying a light emission pulse signal successively to said cathodes;

selectively applying light emission pulse signals based on light emission/non-emission data to each of said anodes in synchronism with the timing of scanning of said cathodes; and applying a slight light emission pulse signal to each of said anodes in synchronism with the timing of scanning of said cathodes;

wherein said cathodes arranged in two rows are scanned in a loop sequence by scanning the cathodes in one of said two rows in the order of their arrangement in one direction thereof and then scanning the cathodes in the other row in the order of their arrangement in the opposite direction.

The above gas discharge type light emission apparatus and method of driving the same are suitably applied to optical print heads, optical reading heads, optical display apparatus and so forth.

BRIEF DESCRIPTION OF THE DRAWINGS

The above and other objects, features and advantages of the present invention will become more apparent from the following description when the same is taken in connection with the accompanying drawings, in which:

FIG. 2 is a view showing a writing structure of the DC type PDP shown in FIG. 1;

FIG. 3 is a view for explaining scanning signals used for driving the prior art DC type PDP;

FIG. 4 is a view for explaining timings of discharge light emission;

FIG. 9 is a plan view showing an electrode structure and wiring of a prior art optical head;

FIG. 10 is a timing chart for explaining a method of driving an optical head having the electrode structure shown in FIG. 9;

FIG. 15 is a fragmentary schematic sectional view showing an embodiment of the invention applied to a plasma light emission apparatus as a gas discharge type light emission apparatus;

FIG. 16 is a view showing an electrode structure of the plasma light emission apparatus shown in FIG. 15;

FIG. 17 is a view for explaining light emission areas of the plasma light emission apparatus shown in FIG. 15;

FIG. 21 is a fragmentary plan view for explaining deficiencies in the light emission window structure of the optical print head shown in FIG. 18.

FIG. 22(a), 22(b) and 23 to 25 are fragmentary plan views for explaining the invention, particularly a light emission window;

PREFERRED EMBODIMENT OF THE INVENTION

Figure 1:
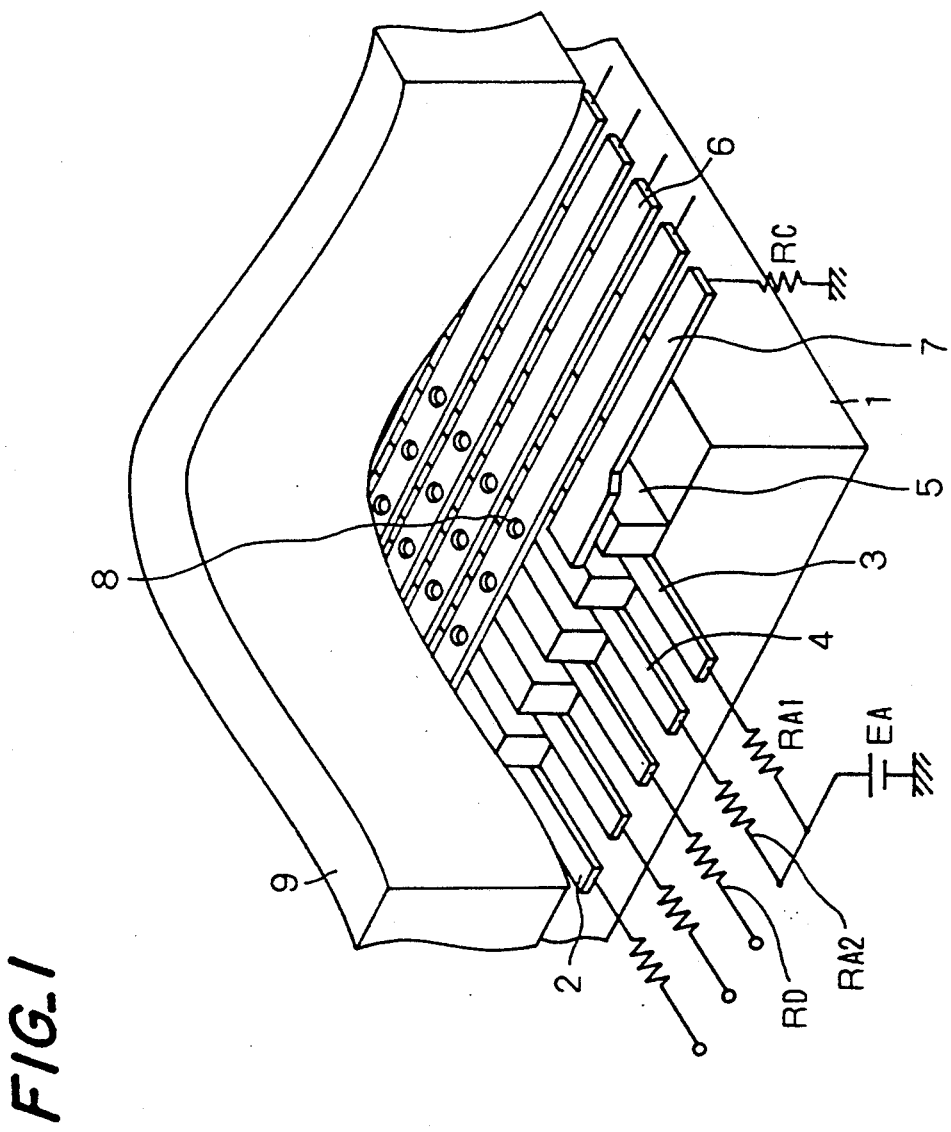
FIG. 1 is a schematic perspective view, partly broken apart, showing a prior art DC type PDP.

Preferred embodiments of the invention will be described hereinunder with reference to the drawings The drawings illustrate the sizes, shapes and positional relation of various components merely schematically such as to permit an understanding of the invention. Further, it is to be understood that the embodiments to be described hereinunder are given for the purpose of illustration only and numerical conditions, sizes, shapes and positional relation in the following embodiments are by no means limitative.

Further, in the drawings like parts and like signals are designated by the like reference numerals and symbols unless doing so presents any problems in the direction of the embodiments The following description roughly concerns a method of driving a plasma light emission apparatus for preventing crosstalk, an electrode structure for obtaining clear light dots and a method of driving in the electrode block.

METHOD OF DRIVING

Now, an embodiment of the invention applied to a gas discharge type optical head will be described.

Figure 12:
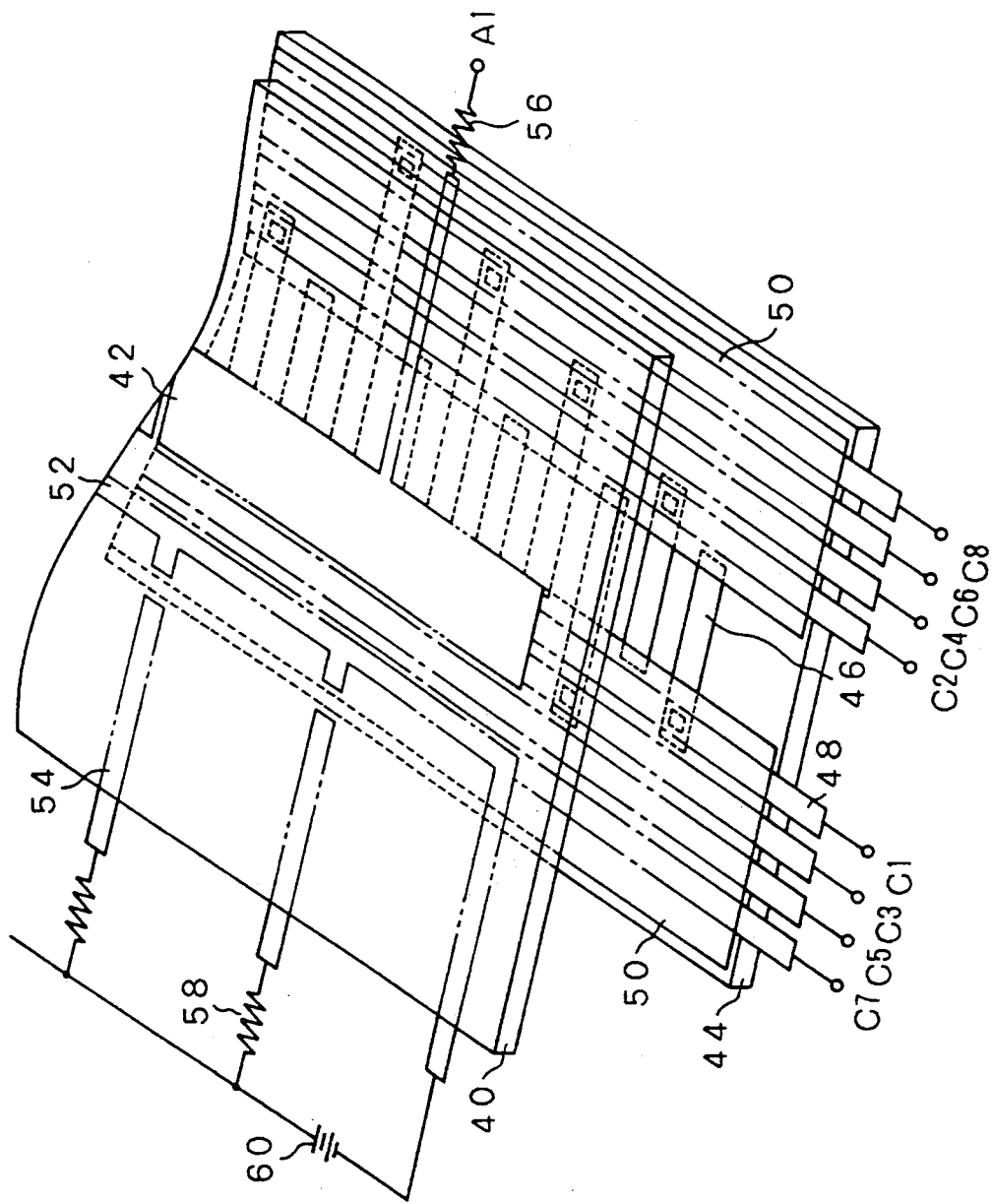
FIG. 12 is a fragmentary perspective view showing a gas discharge type light emission apparatus for explaining an embodiment of the driving method according to the invention.
Figure 13:
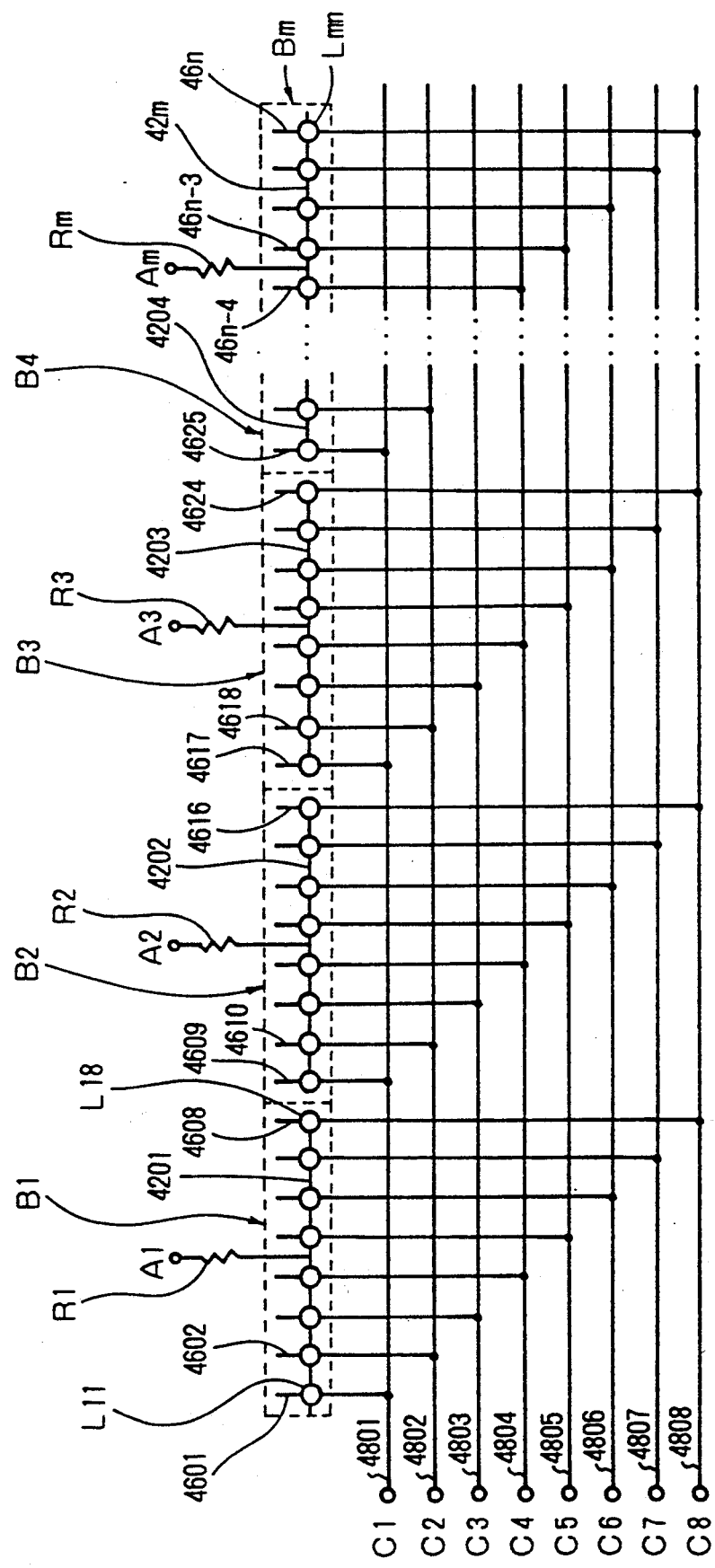
FIG. 13 is a view showing a gas discharge type light emission apparatus wiring structure for explaining an embodiment of the driving method according to the invention.

FIGS. 12 and 13 show a gas discharge type optical head, to which the method of driving according to the invention is suitably applied.

FIG. 12 is a fragmentary schematic perspective view showing the gas discharge type optical head, and FIG. 13 is a view partly showing the wiring structure of the optical head shown in FIG. 12. To help in the understanding of the drawing, in FIG. 12 concealed portions of scanning electrodes are indicated by dash-and bar lines, concealed portions of auxiliary cathode, auxiliary anode and anodes are indicated by double-dash-and-bar lines, and concealed portions of other components are indicated by dashed lines. Further, indication of concealed portions is partly omitted In FIG. 13, discharge cells formed in areas where anode and cathodes face one another are indicated by circles.

Referring now to FIGS. 12 and 13, there is shown an optical head, which comprises a front substrate 40 made of glass or a like transparent material. On the front substrate 40 are provided a plurality of transparent anodes 4201, 4202, ..., 42m (generally designated at 42) made of indium tin oxide (ITO), for instance, arranged in a row extending in a main scanning direction. An auxiliary cathode 52 is also provided on the front substrate such that it extends in the direction of row of the anodes 52. A plurality of auxiliary anodes 54 are further provided on the front substrate such that they are spaced apart at a predetermined interval in the directions of arrangement of the anodes 42 and that they each have one end facing the auxiliary cathode 52. Designated at 56 are current-limiting resistors each connected in series with each anode 42, at 58 auxiliary discharge current-limiting resistors each in series with each auxiliary anode 54, and at 60 an auxiliary discharge power supply.

On a rear substrate 44, a plurality of parallel cathodes 4601, 4602, ..., 46n are provided in a row extending in the main scanning direction.

One anode 42 and a suitable number of cathode 46 facing that anode 42 (for instance the anode 4201 and eight cathodes 4601 and 4608) constitute a unit electrode block. A plurality of electrode blocks Bi (i=1, 2, ... m) each having the above structure are arranged side by side in the main scanning direction to constitute an electrode block line. Predetermined discharge cells, L11, ..., L21, ..., Lmn for writing light data are formed in areas where the anodes 42 and cathodes 46 face one another. These discharge cells are thus arranged in a row extending in the main scanning direction.

From the instant of the application of an "on" voltage signal to anode 42 and cathode 46 till the instant of the start of discharge between these electrode, there is a statistical discharge start delay (i.e., discharge start delay time). Accordingly, auxiliary discharge is provided at all times between the auxiliary anode 54 and auxiliary cathode 52, thus applying ions and excited atoms to the discharge cells to suppress the statistical discharge start delay (which is referred to as priming effect).

On the rear substrate 44 are further formed suitable numbers of scanning electrodes 48 on both sides of the row of cathodes 46; for instance scanning electrodes 4801 to 4804 are formed on one side, and scanning electrodes 4805 to 4808 on the other side. Every other ones of cathodes 42 have extensions connected to scanning electrodes 48 on either side.

Figure 5:
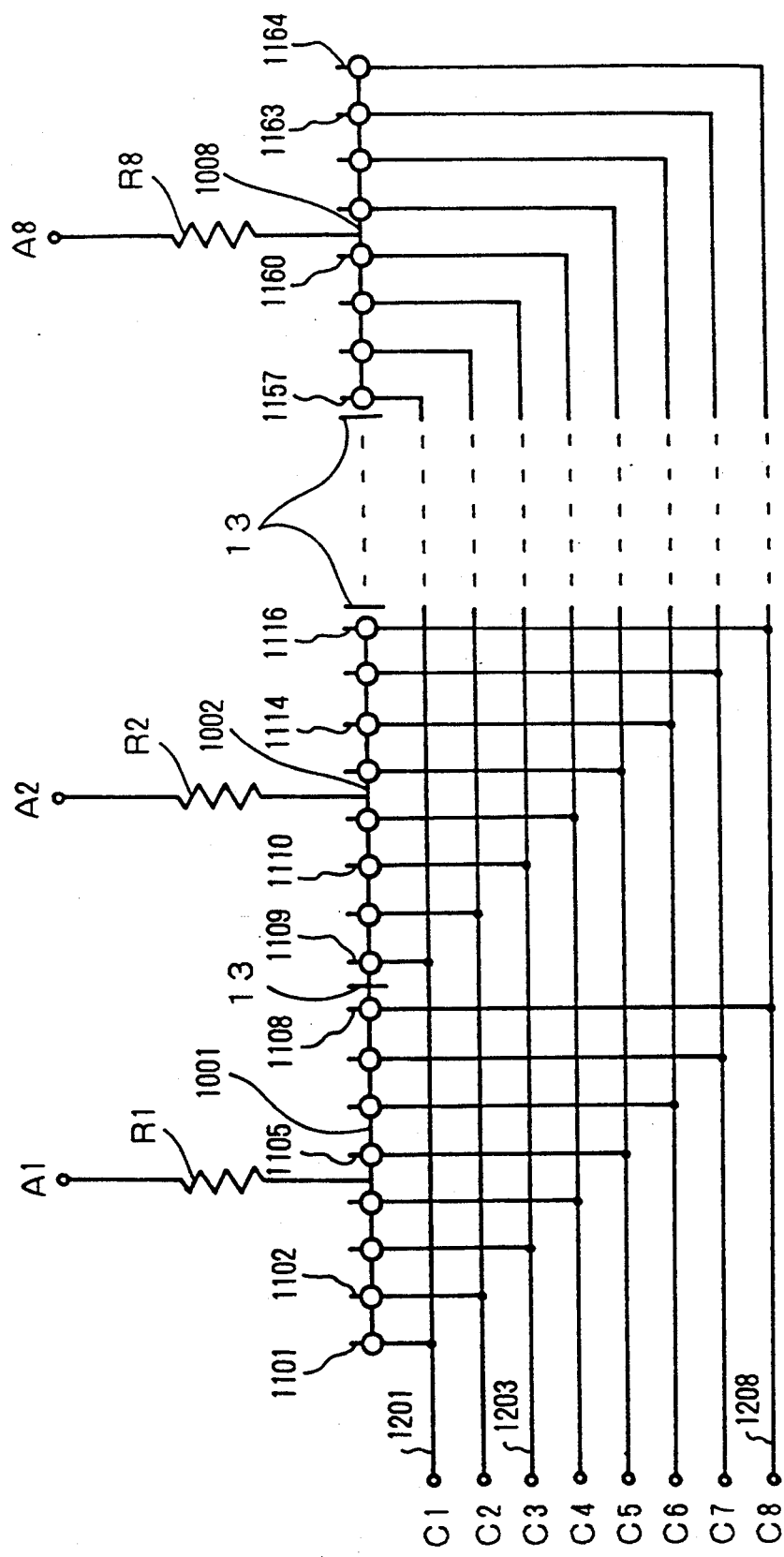
FIG. 5 is a view showing a writing structure of a gas discharge type light emission apparatus with partitioning members provided for crosstalk prevention.

As shown in FIG. 13, the cathode 46 in each unit electrode block are electrically connected to a respective different scanning electrode 48 by multi-layer matrix wiring, for instance the cathodes 4601, 4609, ... are connected to the scanning electrode 4801, the cathodes 4602, 4610, ... are connected to the scanning electrode 4802, and so forth, like the wiring showing in FIG. 5. Data signals A1, A2, ..., Am are supplied through resistors R1, R2, ..., Rm to the anodes 4201, 4202, .., 42m, and scanning signals C1, C2, ..., C8 are supplied to the scanning electrodes 4801, 4802, ..., 4808.

On the rear substrate 40 are further provided light emission restriction layers 50 consisting of a dielectric paste such as to expose areas where the cathodes 46 and anodes 42 face one another and cover opposite side portions of the row of cathodes 46.

The edge of the substrates 40 and 44 are sealed together by a hermetical seal section (not shown) with a spacer provided to hold the substrates spaced apart a fixed distance, thus sealing the anodes 42 and 54, cathodes 46 and 52 and a discharge gas medium, for instance a gas mixture consisting of Ne and Ar. The plasma light emission apparatus shown in FIGS. 12 and 13, unlike the plasma light emission apparatus described before in connection with FIG. 5, comprises no crosstalk prevention partitioning member.

In the wiring structure shown FIG. 13, in two adjacent electrode blocks, for instance B1 and B2, are considered hereinafter to be first and second electrode blocks, respectively. Among the cathode in the electrode block B1, the end cathode 4608 nearest the other electrode block B2 is referred to as one cathode (or a first cathode). Also, among the cathodes 4609 in the other electrode block B2 the end cathode nearest the electrode block B1 is referred to as the other cathode (or second cathode). When the two adjacent electrode blocks as above are considered, two adjacent cathodes are defined as follows. Among the cathodes in one of the two adjacent (i.e., first and second) electrode blocks the end cathode nearest the other electrode block is referred to as one cathode (i.e., first cathode), and among the cathodes in the other block the end cathode nearest the afore-said one electrode block is referred to as "the other cathode" (i e., second cathode) For example, the cathodes 4608 and 4609 are respectively denoted one cathode and the other cathode, and also the cathode 4616 in the electrode block B2 and the cathode 4617 in the electrode block B3 are respectively denotes one cathode and the other cathode.

An embodiment of the driving method according to the invention will now be described with reference to Figs 12 and 13. To facilitate understanding of the invention, the principles underlying the occurrence and prevention of crosstalk will first be described in connection with an example.

In gas discharge, ions and excited atoms are generated by gas discharge and are attenuated after a stoppage of the discharge. Discharge is very liable to be caused in the presence of many residual ions and excited atoms, that is, it is very liable to take place between the anode of a discharge cell, in which discharge is produced, and an adjacent cathode to the cathode of that discharge cell (for instance, between the anode 4201 and cathode 4609, between the anode 4202 and cathode 4608 and between anode 4202 and cathode 4617). This discharge constitutes crosstalk.

A case of driving the light emission apparatus by a method like the prior art one will now be considered. A case is also taken, in which discharge light emission is to be caused in the discharge cell L11 between the anode 4201 and cathode 4601 subsequent to discharge light emission in the cell L18 between the anode 4201 and cathode 4608.

When the cathodes 4601 to 46n are scanned by applying an "on" signal sequentially to that scanning electrodes 4801, 4802, 4803, 4804, 4805, 4806, 4307 and 4808 in the mentioned order as in the prior art, discharge light emission is caused in the cell L11 subsequent to the cell L18.

During the period, in which there is discharge light emission in the cell L11, an "on" signal prevails on the scanning electrode 4801, so that an "on" signal also prevails on the cathode 4609. That is, an "on" signals simultaneously prevail on the anode 4201 and cathode 4609

Further, many ions and excited atoms remain in the neighborhood of the cell L18 for a while after the stoppage of discharge light emission in the cell L18. Therefore, a situation is provided in which discharge light emission can be very readily caused between the anode 4201 of the cell L18 and cathode 4609 adjacent to the cathode 4608 of the cell L18. Discharge light emission also can very readily take place between the anode 4201 and cathode 4607.

Since "on" signals are applied to the anode 4201 and cathode 4609 while discharge light emission can be very readily caused, erroneous discharge or crosstalk is liable to be caused between the electrodes 4201 and 4609.

This crosstalk results from sequential application of "on" signals to one (first one) and the other one (second one) of adjacent cathodes (for instance cathodes 4608 and 4609) in the mentioned order.

According to the invention, the cathodes 4601 to 46n are scanned such that an "on" signal is not sequentially applied to the one (first one) and the other one (second one) of adjacent cathodes. Doing so can prevent crosstalk. The method of driving according to the invention will now be described in detail.

Figure 14:
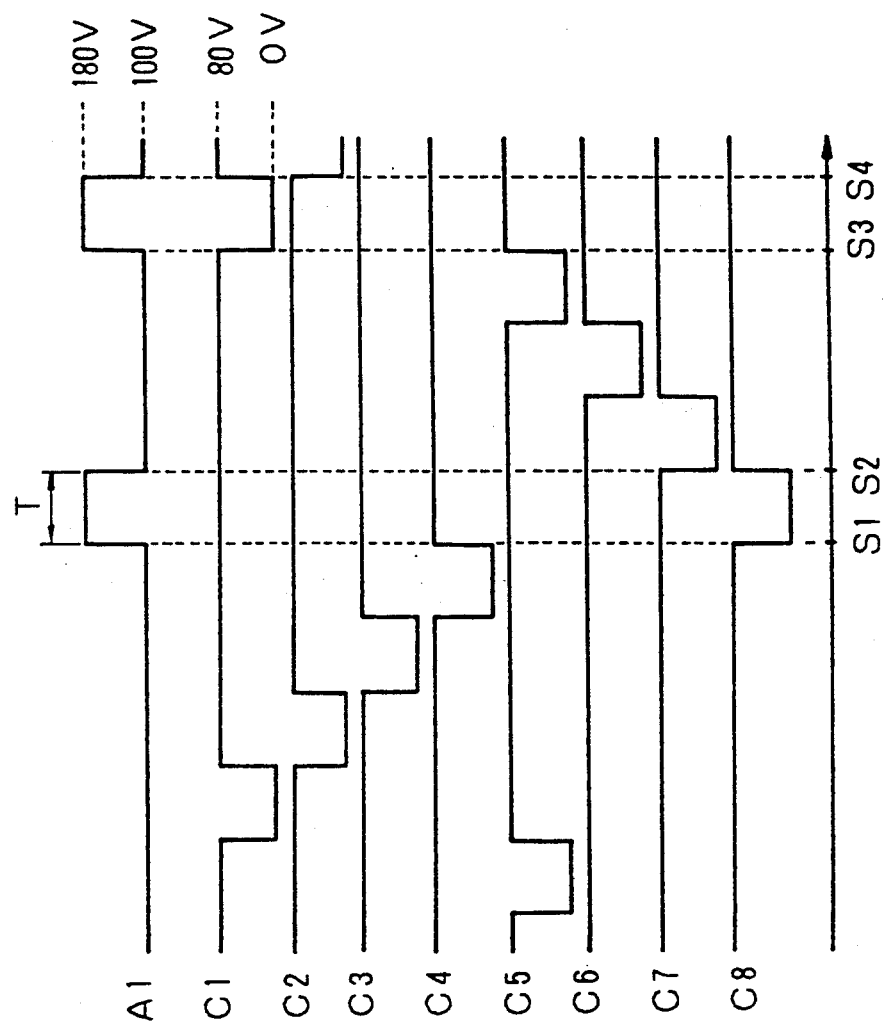
FIG. 14 is a timing chart for explaining an embodiment of the driving method according to the invention.

FIG. 14 is a time chart for explaining an embodiment of the invention; more specifically it shows data signals (typically data signal A1 being shown) and scanning signals C1 to C8.

As shown in FIG. 14, the data signal in this embodiment consists of an "on" state (for instance 180-V voltage state) and an "off" state (for instance, 100-V voltage state provided by anode pre-bias voltage $V_{Apb}$). A pulse of an "on" state (for instance 180-V voltage state) is applied as a unit an "on" signal for period T to the anodes 42.

The scanning signals each consist of an "on" state, for instance 0-V voltage state, end an "off" state, for instance 80-V voltage state provided by cathode pre-bias voltage $V_{Cpb}$. A pulse of an "on" state (for instance 0-V voltage state) is applied as unit "on" signal for period T to the cathodes 46.

As can be seen from FIG. 3, while an "on" signal prevails on the scanning electrode 4301, "on" signal also prevails on the cathodes 4601, 4609, 4617 and so forth and while an "on" signal prevails on the scanning electrode 4802, an "on" signal also prevails on the cathodes 4602, 4610, 4618 and so forth. Generally, while an "on" signal prevails on a scanning electrode, an "on" signal also prevails on the cathodes associated with that scanning electrode.

In the discharge cells L11 to Lmn for optical writing, light emission is caused when "on" signals are applied to both anode 42 and cathode 46, and a light extinction state is produced when an "off" signal is applied to either anode 42 or cathode 46.

According to the invention, the scanning of one and the other one of adjacent cathodes is effected such that after scanning the one cathode (i.e., first cathode) one or more cathodes other than the other cathode (i.e., second cathode) are scanned prior to the scanning of the other cathode (i.e., second cathode) By this method of scanning, the individual cathodes 46 may be scanned by any sequence In this embodiment, the cathodes 46 are suitably scanned by applying an "on" signal sequentially to the scanning electrodes 4801, 4802, 4803, 4804, 4808, 4807, 4806 and 4805 in the mentioned order This scanning is performed repeatedly.

In this scanning, there is no possibility of scanning the one and the other one of adjacent cathodes in the succession, for instance scanning the cathode 4609 next to the cathode 4608 or scanning the cathode 4617 next to the cathode 4616 Since an "on" signal is not applied to the one and the other one of adjacent cathode: in succession, it is possible to prevent crosstalk between adjacent electrode blocks (for instance blocks B1 and B2, B2 and B3 and B3 and B4) in the direction of the electrode block line (i.e., main scanning direction).

A case will now be considered, in which discharge light emission is caused in the order of the cells L18 and L11. In this embodiment, as shown in FIG. 14, after applying an "on" signal to the scanning electrode 4808 for period S1–S2, an "on" signal is applied sequentially to the scanning electrodes 4807, 4806 and 4805 for period S2–S3, and then an "on" signal is applied to the scanning electrode 4801 for period S3–S4. Thus, considering the one and the other one of adjacent cathodes 4608 and 4609, subsequent to the scanning of the cathode 4608 cathodes other than the other cathode 4609 are scanned prior to the scanning of the other cathode 4609. In other words, the adjacent cathode 608 and 4609 are not scanned in succession.

Thus, when discharge light emission is effected in the cell L18 for the period S1–S2, in the subsequent period S2–S3 residual ions and excited atoms in the neighborhood of the cell L18 are reduced very much substantially to zero. Therefore, an "on" signals can be subsequently applied to the anode 4201 and scanning electrode 4801 without substantial possibility of crosstalk between the anode 4201 and cathode 4609.

The possibility of crosstalk can also be substantially eliminated between other pairs of anode and cathode than the anode 4201 and cathode 4609, between which crosstalk is otherwise liable, for instance the anode 4202 and cathode 4608, and also the anode 1202 and cathode 4617. It is possible to eliminate crosstalk between adjacent electrode blocks.

In this embodiment, the cathodes 4601 to 46n may be scanned in any order so long as the scanning of the one and the other one of adjacent cathodes is effected such that subsequent to the scanning of the one cathode one or more cathodes other than the other cathode are scanned prior to the scanning of the other cathode. As a further example, it impossible to scan the cathodes 4601 to 46n by repeatedly applying an "on" signal to the scanning electrodes 4804, 4803, 802, 4801, 4805, 4806, 4807 and 4808 in the mentioned order.

The above embodiment of the driving method according to the invention is by no means limitative, and it is possible to change the wiring structure, signal waveforms, signal applied application timings and various numerical conditions as described.

Further, the method of driving according to the invention may be applied to various other gas discharge light emission apparatuses other than the optical head described above. For instance, it may be applied to a gas discharge light emission apparatus wi&h two or more rows of discharge cells.

As an example it may be applied to a gas discharge optical head, in which two., i.e., first and second, rows of cathodes extending in a main scanning direction are arranged in an auxiliary scanning direction, and anodes are arranged such that they face the cathodes in the first and second rows such that each of the anodes and a suitable number of cathodes in each of the first and second of cathodes constitute a unit electrode block, a plurality of these electrode blocks being arranged to form an electrode block line extending in the main scanning direction.

As is obvious from the description of the above embodiment, in the driving of a gas discharge light emission apparatus, which has at least one electrode block line constituted by a plurality of electrode blocks extending in a row, by the method of driving according to the invention, the scanning of one and the other one of adjacent cathodes, one being in one of two adjacent electrode blocks and the other being in the other electrode block, is effected such that subsequent to the scanning of the one cathode one or more cathodes other than the other cathode are scanned prior to the scanning of the other cathode Thus, one and the other one of two adjacent cathodes are not scanned in succession, and hence an "on" signal is not applied to these cathodes in succession. Thus, it is possible to prevent crosstalk between adjacent electrode blocks without the provision of any partitioning member between adjacent electrode blocks in the electrode block line direction.

Since there is no need to provide a partitioning member between adjacent electrode blocks for crosstalk prevention, it is possible to reduce the manufacture cost of the gas discharge light emission apparatus.

Electrode Structure

Now, an electrode structure in a case where the gas discharge light emission apparatus according to the invention is applied to a plasma optical head (print head) will be described.

FIG. 15 is fragmentary sectional view mainly showing the electrode structure of a plasma optical head, and FIGS. 16 and 17 are views for explaining the electrode structure and light emission section of the plasma optical head. According to the invention, the anode is a non-transparent anode with a light take-out window (also referred to as light transmission window or light emission window) The non-transparent electrode is made of material impermeable to light.

Figure 6:
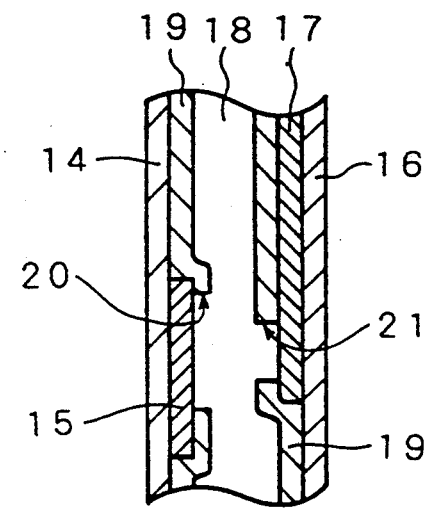
FIG. 6 is a fragmentary perspective view schematically showing a prior art plasma light emission apparatus.
Figure 7:
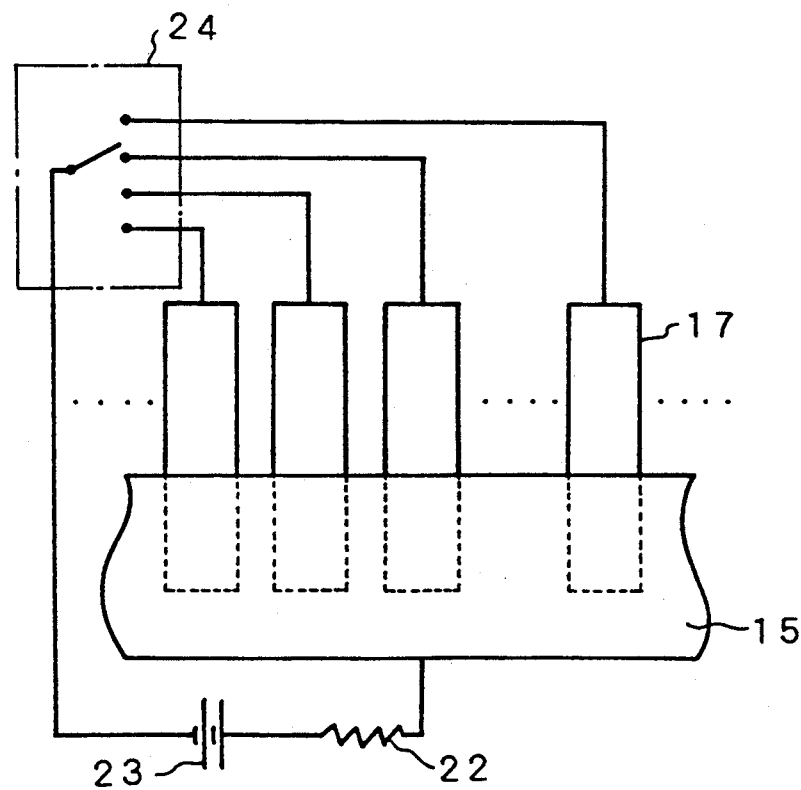
FIG. 7 is a view showing an electrode structure of the prior art plasma light emission apparatus.
Figure 8A:
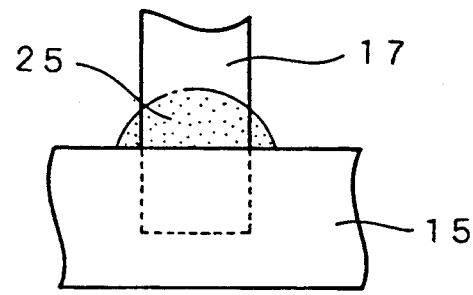
FIGS. 8(a) to 8(c) are views for explaining light emission areas of the prior art plasma light emission apparatus.
Figure 8B:
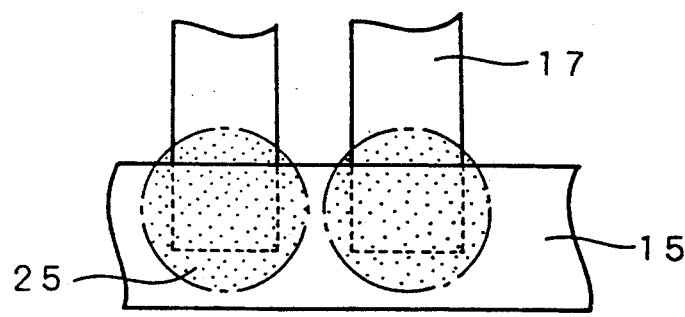
Figure 8C:
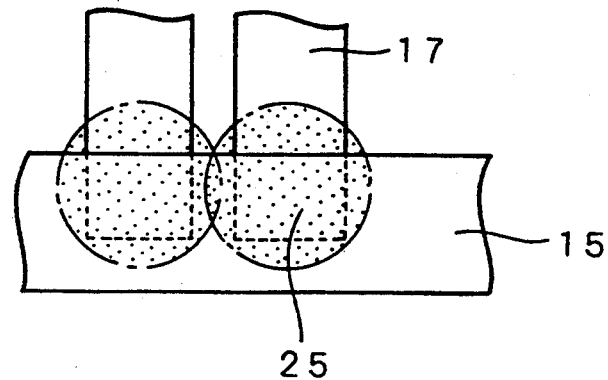
Figure 11:
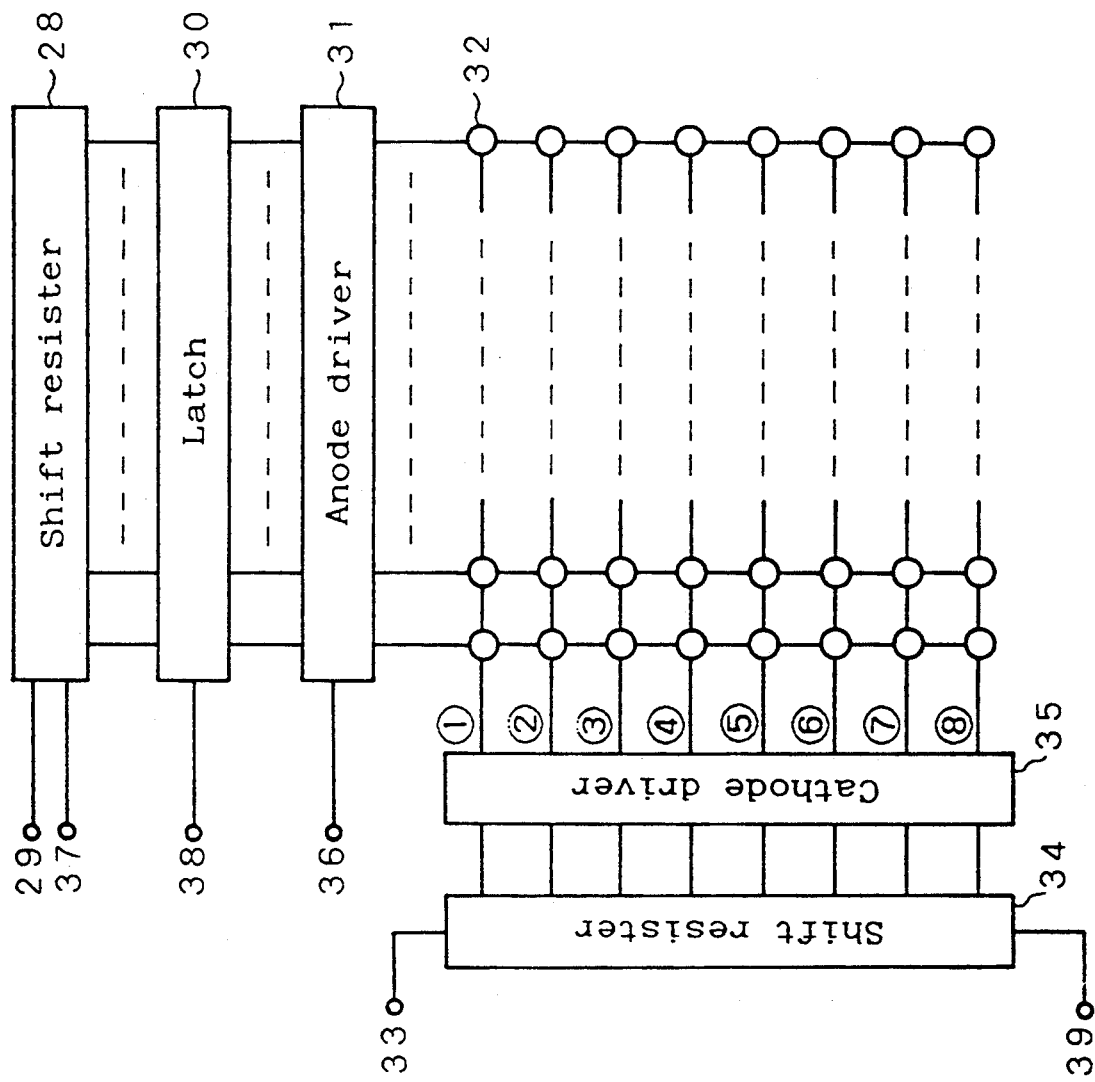
FIG. 11 is a block diagram showing a driver circuit corresponding to the electrode structure shown in FIG. 9.

The embodiment shown in FIG. 15 is the same as those shown in FIGS. 6 and 7 except for the electrode structure of the anode. In FIG. 15, therefore, the anode is designated by reference numeral 62, while designating parts like those in the prior art in FIGS. 6 and 7 with like reference numerals and omitting the description of these like parts. In this embodiment, the anode 62 is formed with a light take-out window 64, the window 64 and a portion surrounding the same are exposed an opening or aperture 20, and a portion of cathode 17 facing the window 64 is exposed by opening or aperture 21.

Actually, a plurality of light take-out windows are formed as window 64 and in the longitudinal direction of the anode 62 at a predetermined internal and at positions corresponding to respective cathodes 17, particularly portions thereof exposed by opening 21.

Both substrates 14 and 16 are glass substrates. The anode 62 is made of a material capable of being satisfactorily deposited on a glass substrate, for example, nickel-chromium alloy (NiCr), chromium (Cr), aluminum (Al) and nickel (Ni), and its thickness is suitably 1,500 to 2,000 angstroms.

The light take-out windows 64 are suitably square in shape with one side being as long as about 200 microns. They are formed in a row at a pitch of about 400 microns in the longitudinal direction of the anode.

The cathodes 17, which are provided on the glass substrate 16, suitably consists of Ni. They may have a thickness of 15 to 20 microns and a pattern width of 200 microns and be arranged at a pitch of about 400 microns.

The distance between the electrodes 17 and 62 is suitably about 200 microns.

As shown in FIG. 17, with this embodiment of the optical head, in which the anode 62 is a non-transparent electrode having the light take-out windows 64, a greater amount of light emitted in the light emission section 66 can be taken out through each light takeout window 64 compared to the case of the prior art arrangement.

The light emission section 66 is partly concealed by a portion of the anode 62 without the windows 64. Thus, when the distance between adjacent cathodes 17 is reduced to increase the resolution, an area which is subject to overlap of light from adjacent light emission sections 66 at the time of the light emission may be concealed by a portion of the anode 62 between adjacent windows 64. It is thus possible to provide an optical head which has an increased resolution compared to the prior art and is more suited for practical use.

Further, it is possible to permit light emitted in the light emission section 66 at the time of light emission to be taken out only through the associated light take-out window 64 by suitably setting the position, size and shape of each light take-out window 64 and distance between adjacent windows 64 in appropriate relation to the size of the light emission section 66 (i.e., size of the light emission area) The size or broadness of the light emission section 66 can be controlled by the size and shape of portions of the anode 62 and cathode 17 exposed by insulating film 19 (see FIG. 15).

The above embodiment of the electrode structure according to the invention is by no means limitative, that is, the particular numerical values, materials, method of forming parts, positional relation and shapes of parts and other conditions noted above may be changed as described.

The plasma light emission apparatus having the above electrode structure may be applied to a two-dimensional display as well as to an optical head for reading and/or writing data.

With the plasma light emission apparatus described above according to the invention, portions of adjacent light emission sections where overlap of light occurs at the time of light emission can be concealed with a non-transparent electrode with light take-out windows, so that it is possible to set a finer pitch of arrangement of the light emission section compared to the prior art.

Further, since light emitted in the light emission section at the time of light emission is taken out through a window in a non-transparent electrode, it is possible to increase the amount of light taken out compared to the case of the prior art.

Now, a different embodiment of the electrode structure with light take-out windows provided in the anode will be described. In the following description, light take-out windows may also be referred to as light emission windows.

Figure 18:
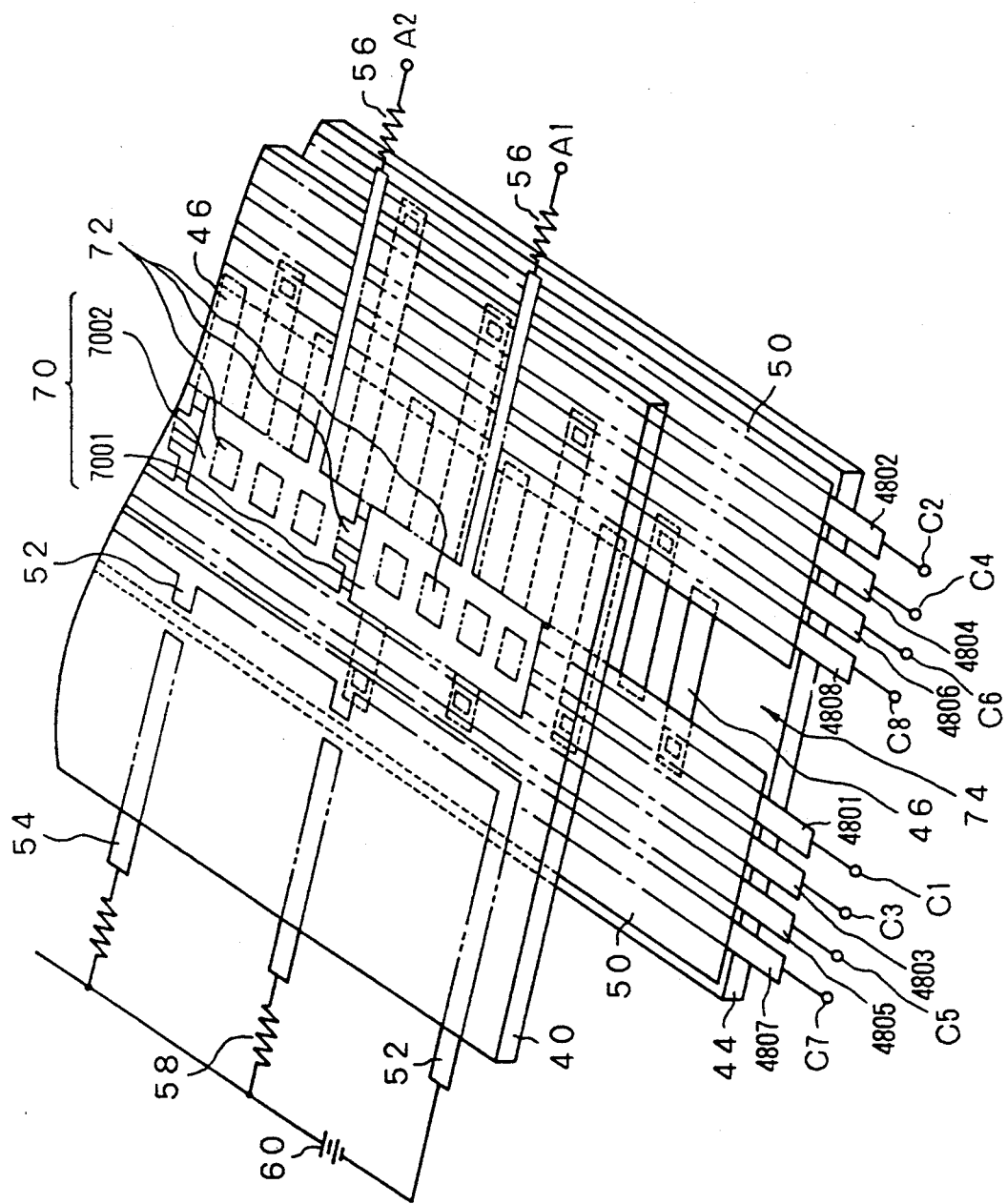
FIG. 18 is a fragmentary perspective view showing an essential part of an embodiment of the gas discharge type light emission apparatus using an optical print head as a light source according to the invention.

FIG. 18 is a fragmentary perspective view showing a gas discharge light emission apparatus using a print head according to the invention as light source, and FIGS. 19(a), 19(b), 20(a), and 20(b) are views showing examples of electrode structure with cathode and anode taken into consideration.

FIGS. 21, 22(a), 22(b), 23(a), 23(b), 24(a), 24(b), 25(a) and 25(b) illustrate further embodiments with light emission windows provided in anodes and end light emission windows provided between adjacent anodes.

An embodiment of gas discharge light emission apparatus will now be described with reference to FIGS. 18 to 20(a) and 20(b). In this embodiment, anodes (generally designated at 70) making up respective electrode blocks are provided with end light emission rows of cathodes, the cathodes in each row have extensions extending up to corresponding scanning electrodes provided on a like side.

Further, on the rear substrate 44 scanning electrodes 48 for supplying discharge light emission scanning pulses to the individual cathodes are provided and connected to the extensions of associated cathodes 46 by multi-layer matrix wiring. In this embodiment, a total of eight scanning electrodes 48 are provided with four of them on each side of the cathode row or rows. In the illustrated example, the scanning electrode 4801 is connected to the cathode 4601, scanning electrode 4803 to cathode 4603, scanning electrode 4805 to cathode 4604, scanning electrode 4807 to cathode 4607, scanning electrode 4802 to cathode 4602, scanning electrode 4808 to cathode 4604, scanning electrode 4806 to cathode 4606, and scanning electrode 4808 to cathode 4608.

Light emission regulation layers 50 consisting of a dielectric paste or the like are further provided on the rear substrate 44 such as to cover at least portions of the cathodes 46 and scanning electrodes 18. A gap defined between these light emission regulation layers 50 constitutes a light emission zone 74.

As noted before, in the gas discharge light emission apparatus according to the invention a common anode faces a plurality of cathodes. Where a single row of cathodes is exposed in the light emission zone 74 (see Figs. 19(a) and 29(a)), the individual anodes 7001, 7002, ... are arranged end to end in the cathode row direction such that they each face a cathode group consisting of four cathodes, for instance a group of cathodes 4601 to 4604, a group of cathodes 4605 to 4608, and so forth. Likewise, where two rows of cathodes are provided (see FIGS. 19(b) and 20(b)), the individual anodes 7001, 7002, ... are arranged in the cathode row direction such that they each face two cathode groups each in each row of cathodes, for instance two groups of cathodes 4601 to 4612, two groups of cathodes 4609 to 4616, and so forth.

It is conceivable to use transparent electrodes as the anodes 70. However, discharge light emission takes place in the neighborhood of each cathode 46, and the light emission area is formed such as to surround the cathode (as shown by dashed line in FIGS. 19(a), 19(b), 20(a) and 20(b)). Therefore, in this case it is liable that the light emission shape (i.e., light emission pattern) is dim or adjacent light dots partly overlap each other. When such dimness or overlap of light is produced, high resolution printing or the like can not be obtained with such a light emission pattern.

For the above reason, the anodes 70 should be made of a light-impermeable material, and for obtaining very clear light emission shape and a high resolution light emission pattern it is necessary to provide the anodes 70 with light emission windows 74 for taking out light emitted by discharge light emission. In order to permit light to be taken out effectively from the light emission zone 74, the light emission windows 72 may be provided at positions of the anodes 70 right above, i.e., just facing, the cathodes 46. Their size and shape may be suitable selected depending on design needs, but they are suitably generally rectangular in shape.

Meanwhile, since the plurality of anodes 70 are arranged end to end, a gap is formed between adjacent anodes, for instance between anodes 7001 and 7002 and between anodes 7002 and 7003. Through such a gap, light from light emission section 66 leaks out. Leaking light has adverse effects on the light emission pattern and deteriorates resolution. According to the invention, positive use of leaking light is made such that it is no longer leaking light but contributes to the light emission pattern. To this end, the pitch of arrangement of cathodes, size of anodes 70 in the direction of array and pitch thereof are selected in such a manner that a cathode is found at a position facing the boundary zone between adjacent anodes 70 or the neighborhood of such boundary zone.

Figure 19A:
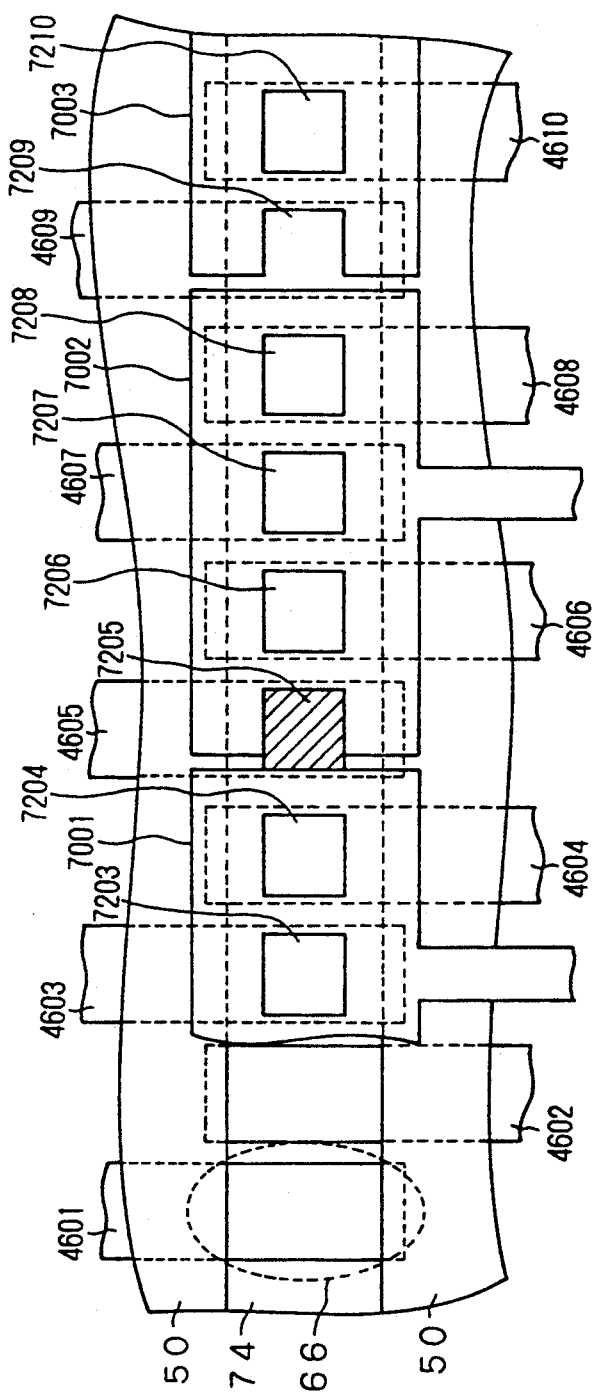
FIGS. 19(a) to 19(c) and 20(a) to 20(c) are fragmentary plan views showing the electrode structure and light emission window structure of an optical print head.
Figure 19B:
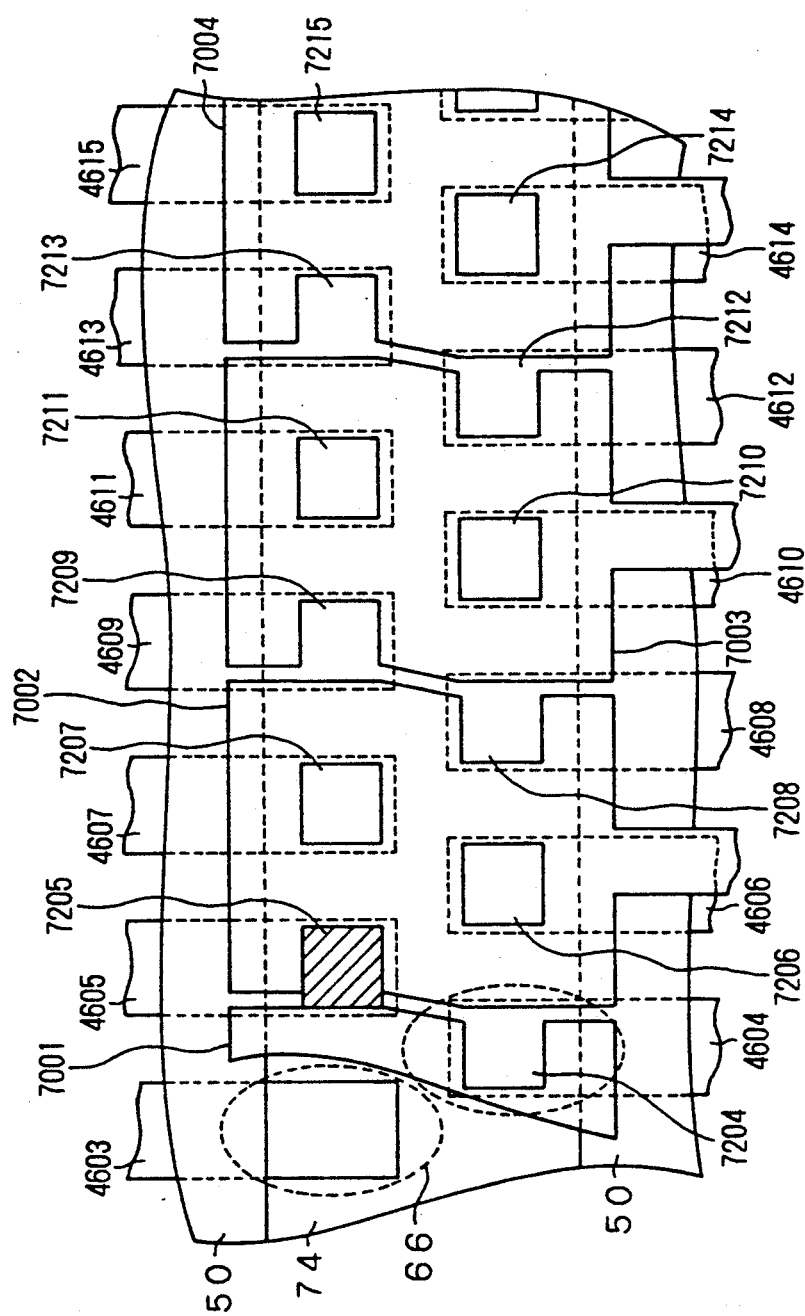
Figure 19:
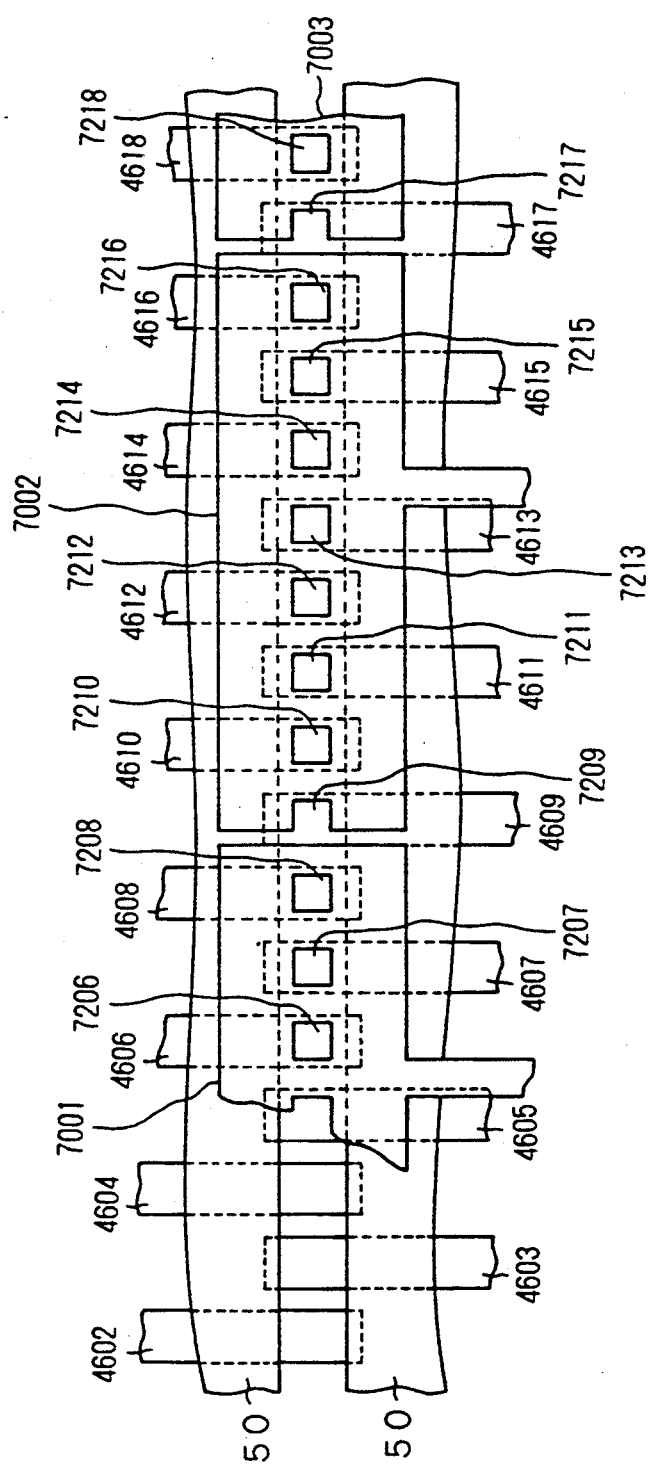
Figure 20A:
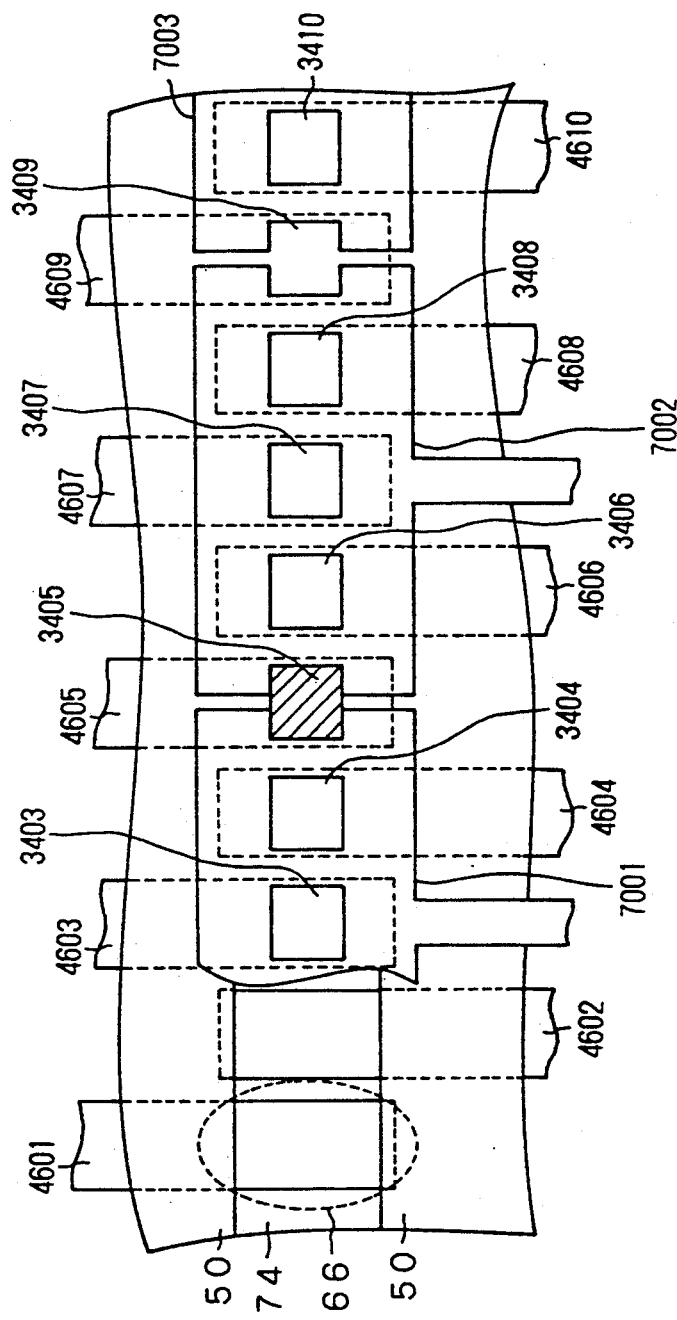
Figure 29A:
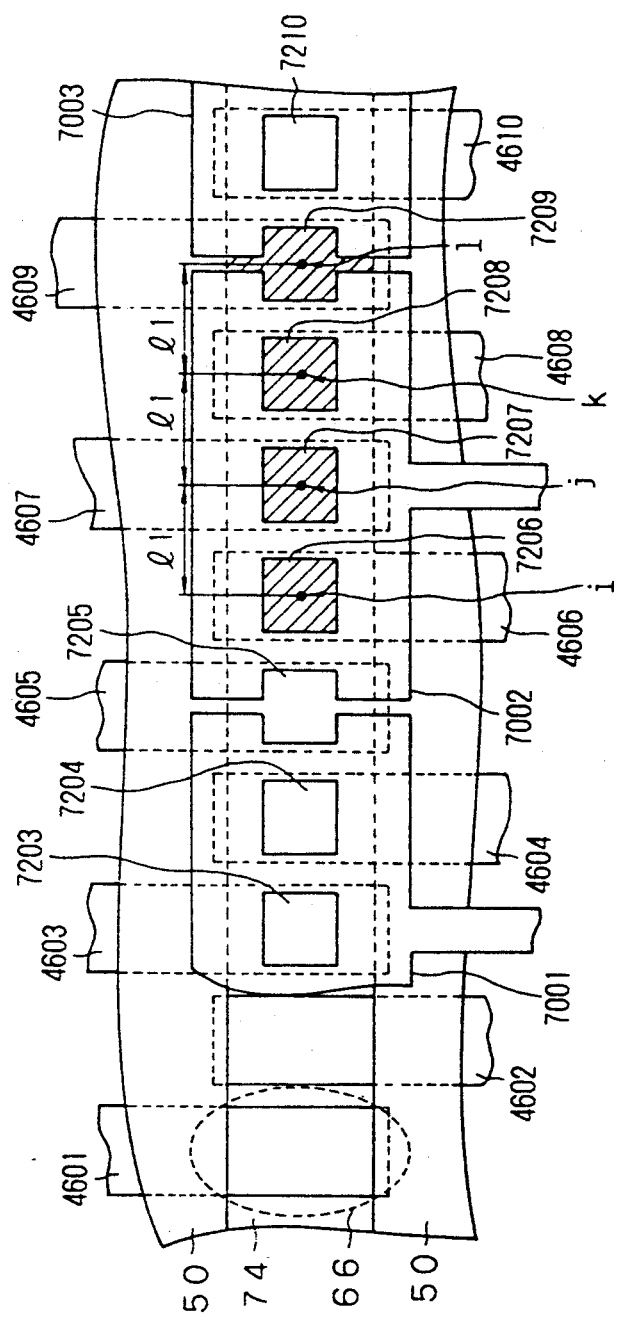
Figure 29B:
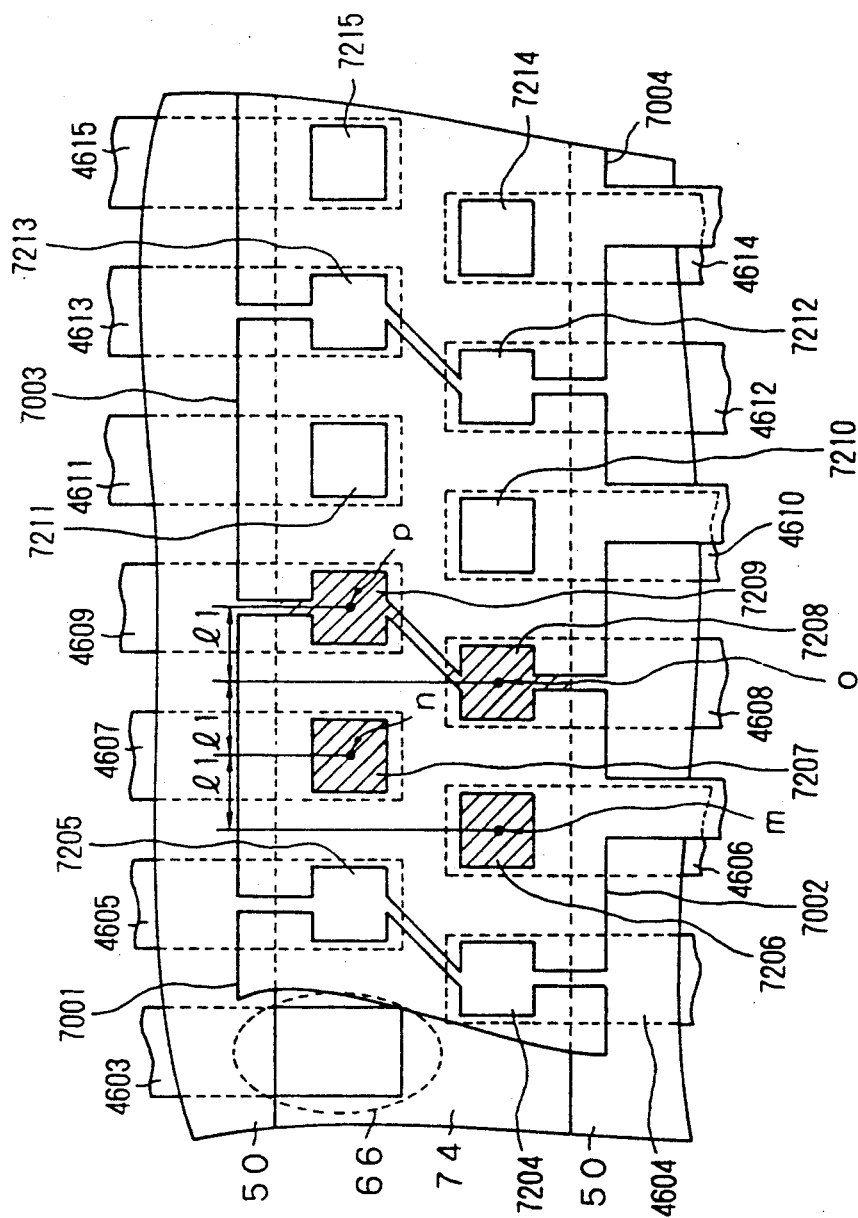

In the examples of Figs. 19(a) and 20(a), such cathode corresponding to the boundary zone or neighborhood thereof between adjacent anodes are designated at 4605, 4609, etc., while in the examples of FIGS. 19(b) and 29(b) they are designated at 4604, 4605, 4608, 4609, 4612, 4613, etc. The window 72 which is provided for a cathode 46 corresponding to the boundary zone on neighborhood thereof between two adjacent anodes 70 is substantially defined by the opposed ends of the two adjacent anodes 70. In this case, the area of each window corresponding to the boundary zone or neighborhood thereof between adjacent anodes and also the area of each window provided in other portion of anode, are projection areas, in which the corresponding cathode is projected on the anode through the window Preferably, these areas are equal. In this embodiment, the light emission window 72 is square in shape, and where a cathode 46 is located in a position corresponding to the neighborhood of one of the opposed edges of adjacent anodes 70, the corresponding light emission window, for instance the window 7205 shown in Figs. 19(a) and 19(b) has one of four sides substantially defined by the end of one anode 7001 and other three sides substantially defined by the opposed end portion of the other anode 7002. In this case, the edge portion noted above of the anode 7202 is formed with a notch in conformity to the shape and size of the square window, and this end portion with the notch is used for forming the window.

Figure 20B:
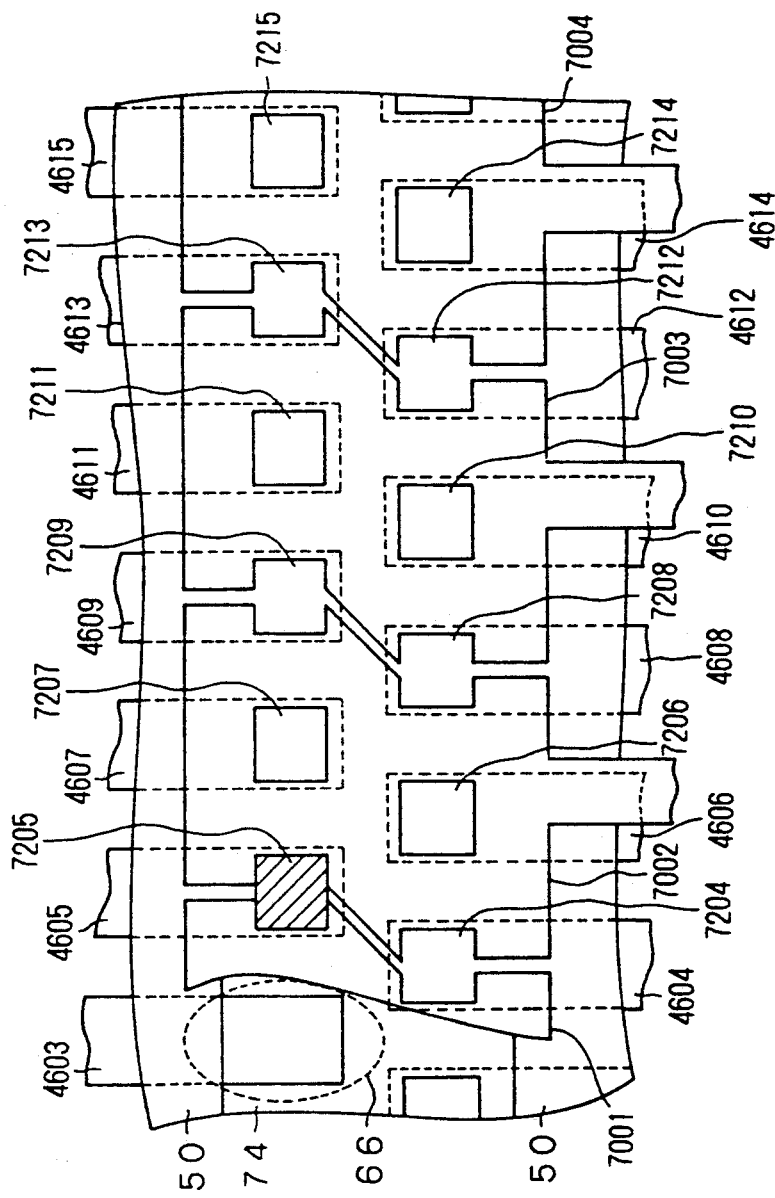
Figure 20C:
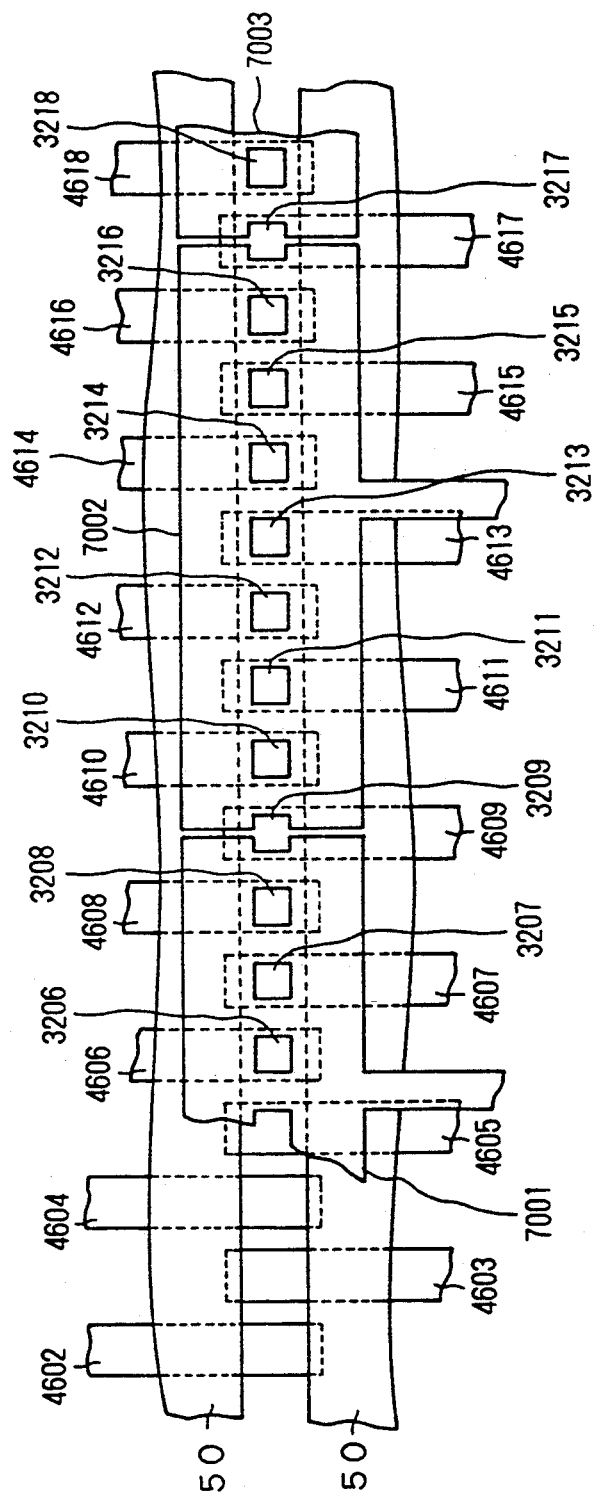

Further, taking the light emission window 7205 shown in FIGS. 20(a) and 20(b), for instance, the cathode 4605 in this case extends across the boundary between two adjacent anodes 7001 and 7002. This light emission window 7205 corresponding to the cathode 4605, therefore, is suitably considered to consist of two divisions arranged side by side in the cathode row direction, one of these divisions being defined by an end portion of anode 7001 and the other division by the end portion of the other anode 7002. In this case, the opposed end portions of the anodes 7001 and 7002 are formed with respective notches in conformity to the shape and size of the square window to be formed, and these end portions with the notches are used for forming the window.

While the above description is concerned with a single light emission window, the same applies to other light emission windows extending across other boundaries between adjacent anodes. While in the above embodiment the light emission windows 72 are square in shape, this shape is by no means limitative; for example, it is possible to adopt any other desired shape such as a rectangular, circle, parallelogram or triangle depending on design needs.

As has been shown, in the gas discharge light emission apparatus according to the invention the anodes are made of a non-transparent material while providing light emission windows not only at positions corresponding to boundaries between adjacent anodes but also at positions corresponding to cathodes facing anode portions other than the boundaries, it is possible to obtain discharge light emission in the neighborhood of the cathodes with a clear shape and also with a high resolution.

In this embodiment, current-limiting resistors 56 are connected to the respective anodes 7001, 7002, . . . to ensure stable discharge between anode 70 and cathode 46 constituting each electrode pair.

Meanwhile, there is a statistical delay of the discharge start timing, i.e., a delay time until the start of discharge from the instant of voltage application to the electrode pair. Therefore, an auxiliary electrode pair is provided on the front substrate 40 on the side of the anodes 70 to provide discharge at all times between the auxiliary electrodes so as to supply ions and excited atoms, thus suppressing the statistical delay of the discharge start timing. In this embodiment, an auxiliary cathode 52 constituting the discharge electrode pairs is provided commonly such that it extends along and parallel to the direction or anode arrangement, while a plurality of auxiliary anodes 54 are provided at a predetermined interval such that they each have one end facing the auxiliary cathode 52. The auxiliary discharge may be brought about for instance by applying a voltage of 300 V from an auxiliary discharge power supply 60 through auxiliary discharge current-limiting resistors 58 of 1 MΩ to the auxiliary anodes 54 while holding the auxiliary cathode 52 at 0 V.

As is obvious from the description of the above embodiment, with the gas discharge light emission apparatus according to the invention, the cathodes 46 and scanning electrodes 48 are provided as substantially planar electrodes on the rear substrate 44, while the anodes 70 and auxiliary electrodes 52 and 54 are provided on the front substrate 40, and both the substrates face each other via a discharge gas medium. The anodes 70 are provided with the light emission windows 72 in correspondence to the cathodes 46. The anodes thus may be arranged in a row or in two rows at a suitable pitch. Thus, the cathode structure and also the structure of the entire apparatus can be simplified compared to the prior art.

A further embodiment of the invention will now be described with reference to FIGS. 22(a) and 22(b) to 25. This embodiment is accomplished with consideration, which will first be described with reference to FIGS. 19(a) and 21. FIG. 21 is similar to FIG. 19(a), but is prepared for explaining drawbacks of the light emission windows of the above embodiment.

In the gas discharge light emission apparatus of the above embodiment, the end light emission window defined by opposed end portions of adjacent anodes is thought to be square in shape as shown at 7205 in Fig. 19(a). Even with the square end light emission window, it produces a light spot having a predetermined shape from leaking light between adjacent anodes. Therefore, with an optical print head having such a light emission window, the resolution is extremely improved compared to a prior art optical print head having no such window. However, since the light emission area 66 is broader than the light emission window 7205 as shown in FIG. 19(a), light leaks out from the cathodes in the neighborhood of the boundary between adjacent anodes through areas 76 shown shaded in FIG. 21. In other words, light leaks out through inter-anode gap portions over and under the square window portions 7205 and 7209 as well as through these window portions. Therefore, if the square window portions 7205 and 7209 are considered to be light emission windows and their area is made equal to the area of light emission windows provided in the anodes (such as windows 7204 and 7207), a greater amount of light is emitted through a window area between adjacent anodes than light through the light emission window 7206 provided in the anode. This means that when this gas discharge light emission apparatus is applied to an electrographic optical print head, a reduction of the resolution and light spot irregularity are liable.

The embodiment shown in FIGS. 22(a) and 22(b) to 25 is provided in order to overcome the above deficiencies. In this embodiment, the square light emission windows 72 provided in the anodes 70 and end light emission windows have an equal area. In this embodiment, each end light emission window 78 is thought to include areas of notches 7806 formed in opposed end portion of adjacent anodes 7001 and 7002, for instance, and also light leakage areas 78a and 78c between adjacent anodes over and under the notch area 78b. In other words, the end light emission window 78 is defined by the opposed anode ends such that the area of cathode exposed by it (i.e., total areas 78a to 78c) is equal to the area of light emission window 78 provided in anode 70. The boundary of the light leakage areas 78a and 78c is determined by the width of cathode 46, hence the width of light emission zone 74. Now, the embodiment will be described in connection with the portion of light emission windows.

FIGS. 22(a) and 22(b) illustrate improvements over the light emission window in the embodiment of gas discharge light emission apparatus shown in FIG. 19(a) in view of the point of consideration in this embodiment. Designated at 72 in FIG. 22(a) is one of light emission windows having an equal area provided in anodes 70 In this case, these light emission windows 72 have an identical shape. Designated at 78 in FIG. 22(b) is an end light emission window in this embodiment. This end light emission window 78 consists of a cathode exposure area 78b defined by a notch formed in an end portion of the anode 7002 facing the anode 7001 and the opposed end of the anode 7001 and the other cathode exposure areas 78a and 78c defined by the gap-defining opposed ends of the anodes 7001 and 7002 and light-emission restriction layers 50. As noted above, the end light emission window 78 is formed, by processing the end portion of the anode 7202 in this embodiment, such that the sum of the cathode exposure areas 78a to 78c is equal to the area of light emission window 72 formed in anode 70.

FIG. 23 is a view showing an improvement over the embodiment of the gas discharge light emission apparatus shown in FIG. 19(b) in connection with the viewpoint in the instant case, FIG. 24 is a view showing an improvement over.

the embodiment of FIG. 29(a) in connection with the viewpoint in the instant case, and FIG. 25 is a view showing an improvement over the embodiment of gas discharge light emission apparatus shown in FIG. 29(b) in connection with the viewpoint in the instant case. In any of the cases of FIGS. 23 to 25, the end light emission window 78 is formed, by processing either one or both of opposed end portions of anodes 7001 and 7002, such that the sum of the cathode exposure areas 78a to 78c is equal to the area of light emission window 72 (FIG. 22(a)) provide <in anode 70.

Again in this embodiment, the light emission windows 72 provided in the anodes need not be square in shape as shown in FIG. 22(a), but it is possible to adopt various other shapes as noted before in connection with the previous embodiment. The shape of the end light emission windows 78 also is not limited to those shown in FIGS. 22(b) to 25. In the design, however, it is suitable to determine the area ratio of the cathode exposure areas and size ratio individual sides of notch or notches defining the area 78b such as to approximate the shape of light emission window 72 provided in the anodes as much as possible.

The operation of the gas discharge light emission apparatus shown in FIGS. 18 to 25 will row be described.

Figure 26:
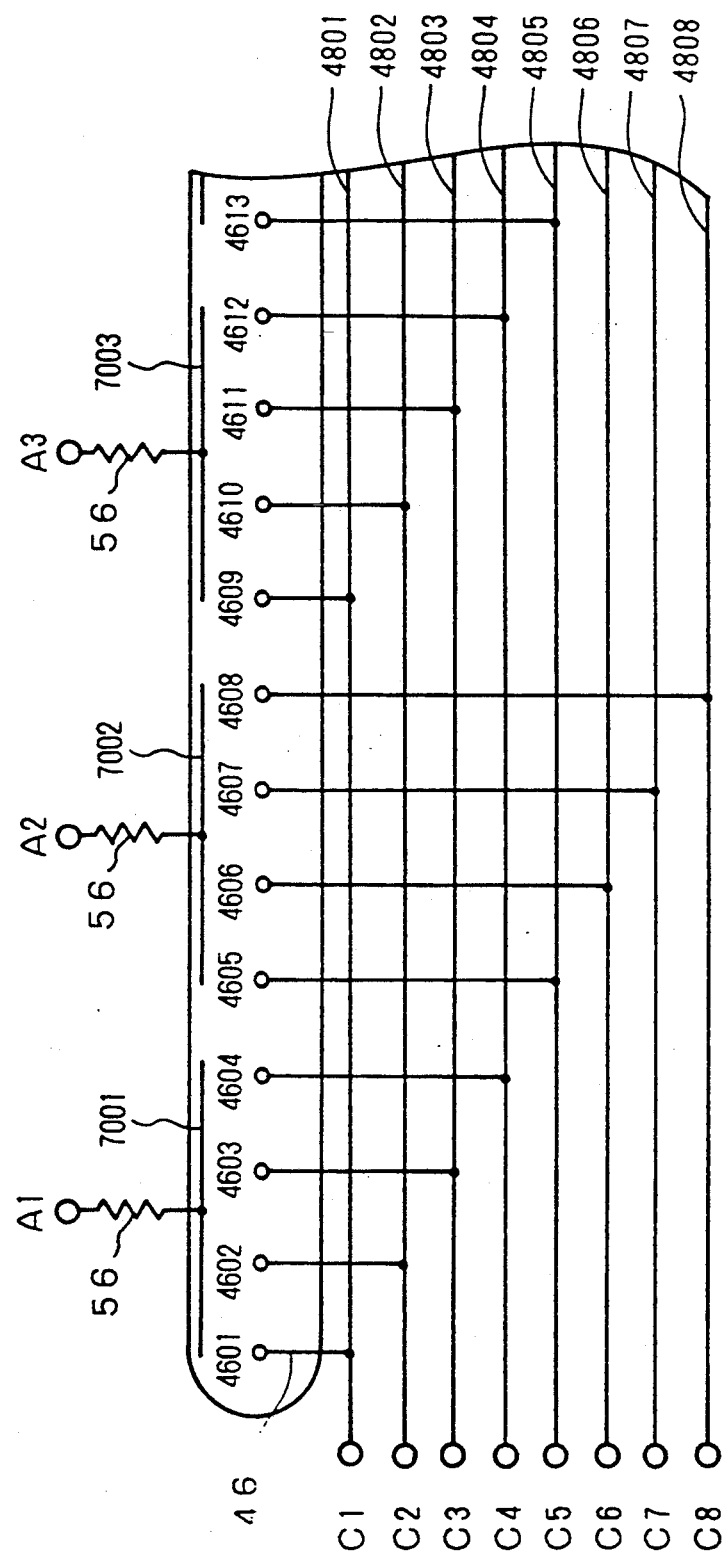
FIG. 26 is a connection diagram showing the connection of anodes and cathodes in the embodiment shown in FIG. 18.

FIG. 26 is an anode/cathode connection diagram in the example of scanning electrodes 48, cathodes 46 and anodes 70 in the structure shown in FIG. 18. Parts like those in FIG. 18 are designated by like reference symbols. Further, in FIGS. 18, 20(a) and 20(b), designated at C1 to C8 are scanning pulses applied to the individual cathodes 46 and at A1, A2, ... are data signals.

Figure 27:
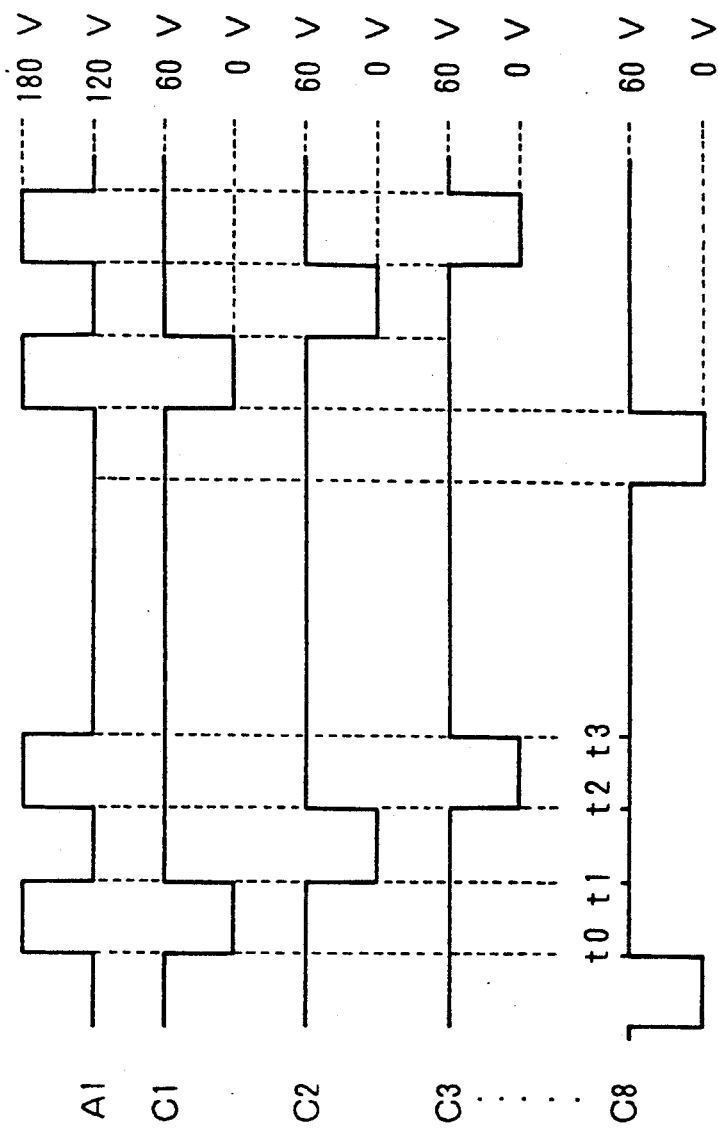
FIG. 27 is a voltage application timing chart for the explanation of the embodiment shown in FIG. 18.

FIG. 27 is a voltage application timing chart of the examples of data signal A1 and cathodes scanning pulses C1 to C8. Data signal A1 and scanning pulses C1 to C3 will now be considered. The data signal A1 which is applied to the anode 7001 through the associated current-limiting resistor 56 is a pulse voltage at 120 V in an "off" state and 180 V in an "on" state. The scanning pulse voltage applied to the cathodes 46 are 60 V in an "off" state and 0 V in an "on" state. The data signal A1 is in an "on" state while an "on" state scanning pulse prevails on a cathode 46, for which discharge light emission is intended, and in an "off" state otherwise. Discharge light emission is brought about when the potential differences between voltages on the anode and cathode exceeds a discharge start voltage of about 140 V. Thus, in the case of the data signal A1 shown in FIG. 27, discharge light emission is caused for the cathodes 4601 and 4603. In this way, cathodes 46, for which discharge light emission is to be brought about, are determined by a combination of the data signals A1, A2, ... nd scanning pulses C1 to C8. Light emitted in light emission for the cathodes 46 is emitted through the corresponding light emission windows 72 (inclusive of light emission windows 78), thus obtaining a desired light dot pattern. The light dots thus obtained have a clear shape defined by the predetermined shape of windows 72 [FIGS. 18 to 21) and 78(FIGS. 22(a) and 22(b) and 25). Further, since light emission windows 34 (FIGS. 18 to 21) and 53(FIGS. 22(a) and 22(b) to 25) are also provided at positions corresponding to boundaries between adjacent anodes, light leaking from the gap between anodes has no adverse effects on resolution, and thus a high resolution light dot pattern can be obtained It is thus possible to eliminate dimness of the light dot pattern and partial overlap of adjacent light dots.

In the above embodiment, a total of eight scanning electrodes 48 are provided with four of them allotted for each of the successive anodes 70. With this structure, an "on" state voltage of 180 V is not simultaneously applied to adjacent anodes 70 through current-limiting resistors 56, and thus there is no possibility of crosstalk, i.e., erroneous discharge between a certain cathode and a cathode adjacent to the anode associated with that cathode.

It is possible to drive the optical print head having any of the window structures shown in FIGS. 18 to 21 by the method of driving described above with reference to FIGS. 12 to 14. For example, taking &he optical print head of FIG. 19(c) having the window structure shown in Fig. 19(a) and wiring structure shown in FIG. 13, in the sequence of scanning signal application to the cathodes, subsequent to application of an "on" signal to the cathode 4608 corresponding to the window 7208, for instance, an "on" signal is not applied to the cathode 4609 corresponding to the end light emission window 7209, but it is applied to the cathode 4609 subsequent to its application to one or more cathodes selected from the cathodes 4610 to 4615 corresponding to the windows 7210 to 7215.

Likewise, in the case of the optical print head shown in FIG. 29(c) having the window structure shown in FIG. 29(a) and wiring structure shown in FIG. 13, in the sequence of scanning signal application to the cathodes, subsequent to application of an "on" signal to the cathode 4608 corresponding to the window 3208, for instance, an "on" signal is not applied to the cathode 4609 corresponding to the end light emission window 3209, but it is applied to the cathode 4609 subsequent to its application to one or more cathodes selected from the cathodes 4610 to 4619 corresponding to the windows 3210 to 3215.

Thus, with the method of driving described above in connection with FIGS. 13, 19(c) and 20(c), unlike the case of the driving method described above in connection with FIGS. 18 to 21 and 26, crosstalk can be eliminated with a structure in which one anode faces eight cathodes with the provision of eight scanning electrodes 48. That is, the anodes can be reduced in number to one half. The anode drive circuits thus can be reduced in number, so that cost reduction of the apparatus can be expected.

As has been shown, with the above embodiment of the gas discharge light emission apparatus and optical print head according to the invention, the cathodes are provided in a row or a plurality of rows at a suitable pitch depending on design, two or more anodes are provided such that each of them faces a plurality of cathodes in each row of cathodes via a discharge gas medium, and light emission windows for defining light dots are provided for the individual cathodes and also for boundaries or neighborhood thereof between adjacent anodes. Thus, the cathode structure is simple compared to the prior art cathode structure, and the integration density of cathodes, and hence light dots, can be obtained by varying the pitch of the cathode array. Further, since the light emission windows are provided as light take-out windows at positions corresponding to portions of anodes facing cathodes and also at boundaries between adjacent anodes, it is possible to obtain clear light dots without increasing a dimness of dots at a high resolution.

Further, by forming each end light emission window with corresponding opposed end portions of adjacent anodes such that the area of the cathode exposed by the window is equal to the area of light emission windows provided in anodes, more uniform light output can be obtained for each dot, that is, clearer light dots can be obtained with a higher resolution.

Now, a positional relationship among light emission windows 72 provided in anodes and end light emission windows 72 (or 78) each defined by opposed end portions of adjacent anodes will be described.

Figure 28A:
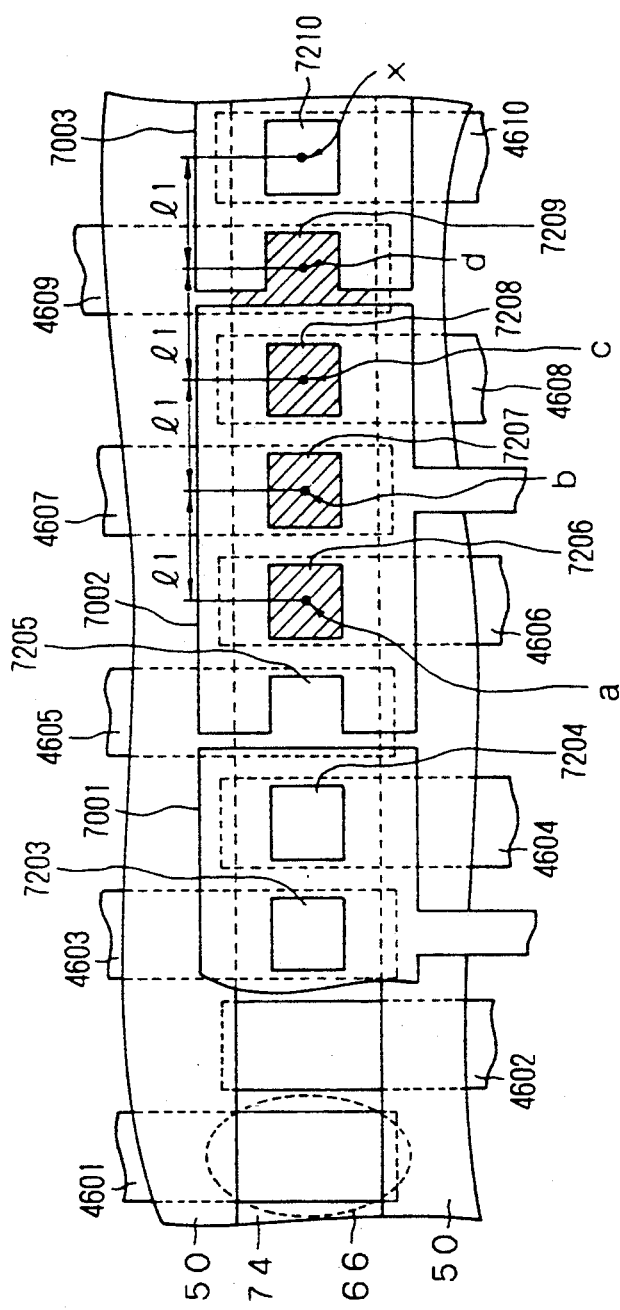
FIG. 28(a), 28(b), 29(a) and 29(b) are fragmentary plan views for explaining light emission windows of the optical print head shown in FIG. 18.
Figure 28B:
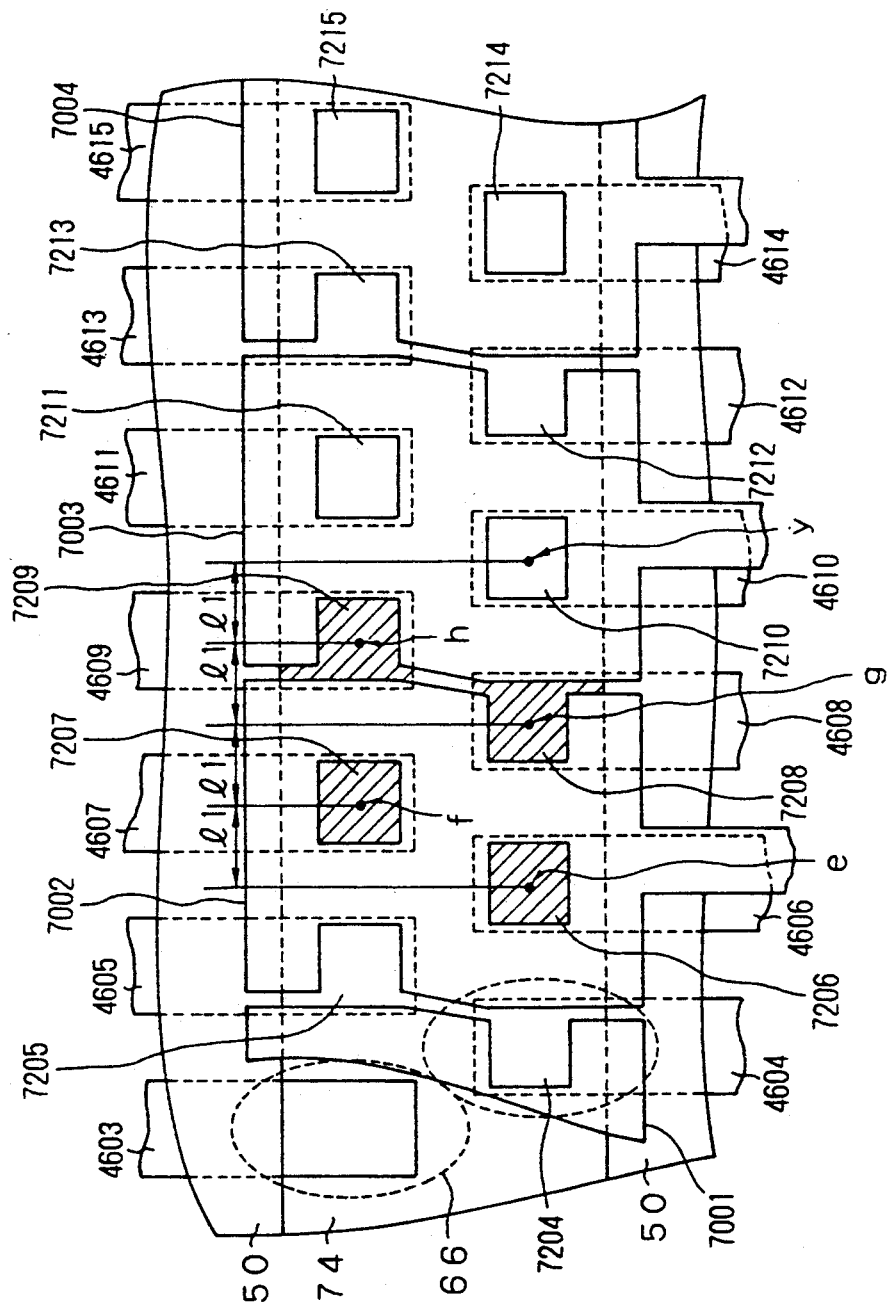

FIGS. 28(a) and 28(b) are similar to FIGS. 19(a) and 19(b), respectively, and FIG. 29(a) and 29(b) are similar to FIG. 20(a) and 20(b), respectively. Like parts are designated by like reference symbols, and their description is omitted.

Referring now to FIGS. 28(a), 28(b), 29(a) and 29(b), among illustrated light emission windows 72 four windows 7206 to 7209 arranged in succession in the line direction are considered. Here, the end light emission windows 78 shown in FIGS. 22(b) to 25 are covered by windows 72.

First, an example of a gas discharge light emission apparatus shown in FIG. 28(a) will be described. In the figure, light dot patterns obtained with light emitted from the light emission windows 7206 to 7209 are shown shaded. The light dot patterns obtained wit the windows 7206 to 7208 are substantially square, while the light dot pattern obtained with the end light emission window 7209 is a combination of light emitted from ar area defined by the notch formed in an end portion of the anode 7003 and light leaking from inter-anode gap areas above and below the area noted above. Therefore, it will be readily understood that the center of light intensity of light obtained from the end light emission window 7209 is deviated from the center of the square area defined by the notch. Therefore, if the end light emission window 7209 is arranged at the same pitch as for the other light emission windows with respect to the center of the area defined by the notch, the pitch of light dots produced by it is deviated. This will introduce pitch irregularity to the light dots, resulting in, for instance, a deterioration of the resolution of the optical print head. According to the invention, the individual light emission windows are arranged such that light leaking from the inter-anode gap areas above and below the notch of end light emission window is utilized such that it contributes to a light dot pattern, as will be described later in greater detail.

The light emission windows 7206 to 7208 shown in FIG. 28(a) are arranged such that their centers a to c are uniformly spaced apart by a distance l1. The term "center" here has a mathematical meaning such as the "center" of a triangle in geometry, and it is also referred to as center of a window area. The boundary between adjacent anodes in the gap therebetween in the window is determined by the width of cathode That is, when the cathode image is projected, the edges of the projected cathode image constitute boundaries of the gap portion of the window. It is best that the windows have an equal area. Further, the windows suitably have an identical shape, although this is not essential In the case of FIG. 28(a), the end light emission window 7209 has a greater area proportion on the side of the light emission window 7208 due to the inter-anode gap between the anode 7002 and 7003. Therefore, the position of the center d of the window 7209 is closer to the center of the window 7208 compared to the case where the end light emission window is to be constituted by the sole notch formed in the anode 7003. According to the invention, the end light emission window 7209 is defined by the opposed end portions of adjacent anodes such that the center d of the shaded area shown in FIG. 28(a), i.e., total inter-anode area, from which light is emitted, is spaced apart an equal distance l1 from the centers a and x of the windows 7208 and 7210. With this arrangement, the individual light emission windows 7206 to 7209 are arranged at a uniform pitch with respect to the centers of their areas. The area of the end light emission window 7209 (i.e., shaded area in FIG. 28(a)) is suitably made equal to the area of window 7208 and other windows provided in anodes. However, this is by no means limitative; for example, the area of a main portion of the end light emission window 7209, i.e., the square area defined by the notch formed in anode, may be made equal to the area of window 7208 and like windows.

Now, a preferred example of a gas discharge light emission apparatus shown in FIG. 28(b) will be described. In this case, end light emission windows as those designated at 7208 and 7209 are subject to the influence of light leaking from the inter-anode gap. More specifically, the end light emission window 7208 has a greater area proportion on the side of the window 7210 due to an influence of the inter-anode gap between the anode 7002 and 7003. Therefore, its center position g in the line direction is closer to the center y of the window 7210 compared to the case when this end light emission window is thought to be defined by the sole notch provided in the anode 7002. Also, the end light emission window 7209 has a greater area proportion on the side of the window 7207 due to an influence of the inter-anode gap between the anodes 7002 and 7003. Therefore, its center h in the line direction is closer to the center f of the window 7207 compared to the case when it is to be defined by sole notch formed in the anode 7003. Accordingly, in this case the end light emission windows 7206 and 7209 are defined by opposed end portions of adjacent anodes such that the centers g and h of the respective shaded areas shown in FIG. 28(b), i.e., the entire inter-anode areas, from which light is emitted, are each spaced apart an equal distance l1 from the centers of the opposite side adjacent windows. In this arrangement, the individual light emission windows 7206 and 7209 are arranged at a uniform pitch with respect to the centers of their areas. The area of each of the end light emission areas 7208 and 7209 (i.e., shaded areas shown in FIG. 28(a)) are suitably made equal to the area of window 7202 and like windows provided in anodes However, this is by no means limitative; for instance, the area of a main portion of end light emission window 7209, for instance, the square area defined by the notch provided in the anode, may be made equal to the area of window 7207 and like windows Now, an example of a gas discharge light emission apparatus shown in FIG. 29(b) will be described. In this case, end light emission window 7209 is provided in symmetrical relation to opposed end portions of adjacent anodes 7002 and 7003. In other words, the window 7209 is defined by identical opposite side notches This means that the center of light emission area and the center of the area of window 7209 are identical, thus eliminating deviation of the center of the window when the window is thought to consist of the sole areas defined by the notches. The centers i to l of the light emission windows 7206 to 7209 are spaced apart uniformly by a distance l1. The area of the end light emission window is suitably determined in the manner as described before in connection with FIGS. 28(a) and 28(b).

Now, an example of gas a discharge light emission apparatus shown in FIG. 29(b) will be described. Again in this case, the individual light emission windows are arranged at a uniform pitch of the centers of their areas. For example, windows 7206 and 7207 provided in an anode and end windows 7208 and 7209 are arranged such that their centers m to p are uniformly spaced apart by a distance 11.

While in the description of the above examples some of the light emission windows in the individual gas discharge light emission apparatuses are considered, the same applies to the other windows as well.

The uniform pitch arrangement of the window centers as above permits the following advantages to be obtained in addition to the advantages of the plasma light emission apparatus described before in connection with Figs. 18 to 27.

Since the light dot size is prescribed by each light emission window, there is no possibility of size increase or dimness of the light dots (i.e., bright spot). In addition, since the individual light emission windows are arranged at a uniform pitch of the centers of their areas, no pitch irregularity is introduced into light spots obtained from the individual light emission windows.

While the electrode structure, in which anodes constituting respective electrode blocks are provided with light emission windows, is effective for eliminating crosstalk or erroneous discharge as described above, even with this electrode structure crosstalk is liable to be caused between one anode and a cathode facing an adjacent anode to that anode.

Such crosstalk can be prevented by setting the distance between anode and cathode, between which crosstalk is liable, particularly the distance between one anode and a cathode facing the other anode and nearest to the first-mentioned anode, to a distance substantially free from the occurrence of any crosstalk.

Examples of such an electrode structure which can eliminate crosstalk or erroneous discharge will now be described with reference to FIGS. 30 to 34.

In these figures, parts like those in FIGS. 18 to 21 are designated by like reference symbols, and common contents as described before are no longer mentioned to avoid duplication of description.

Figure 30:
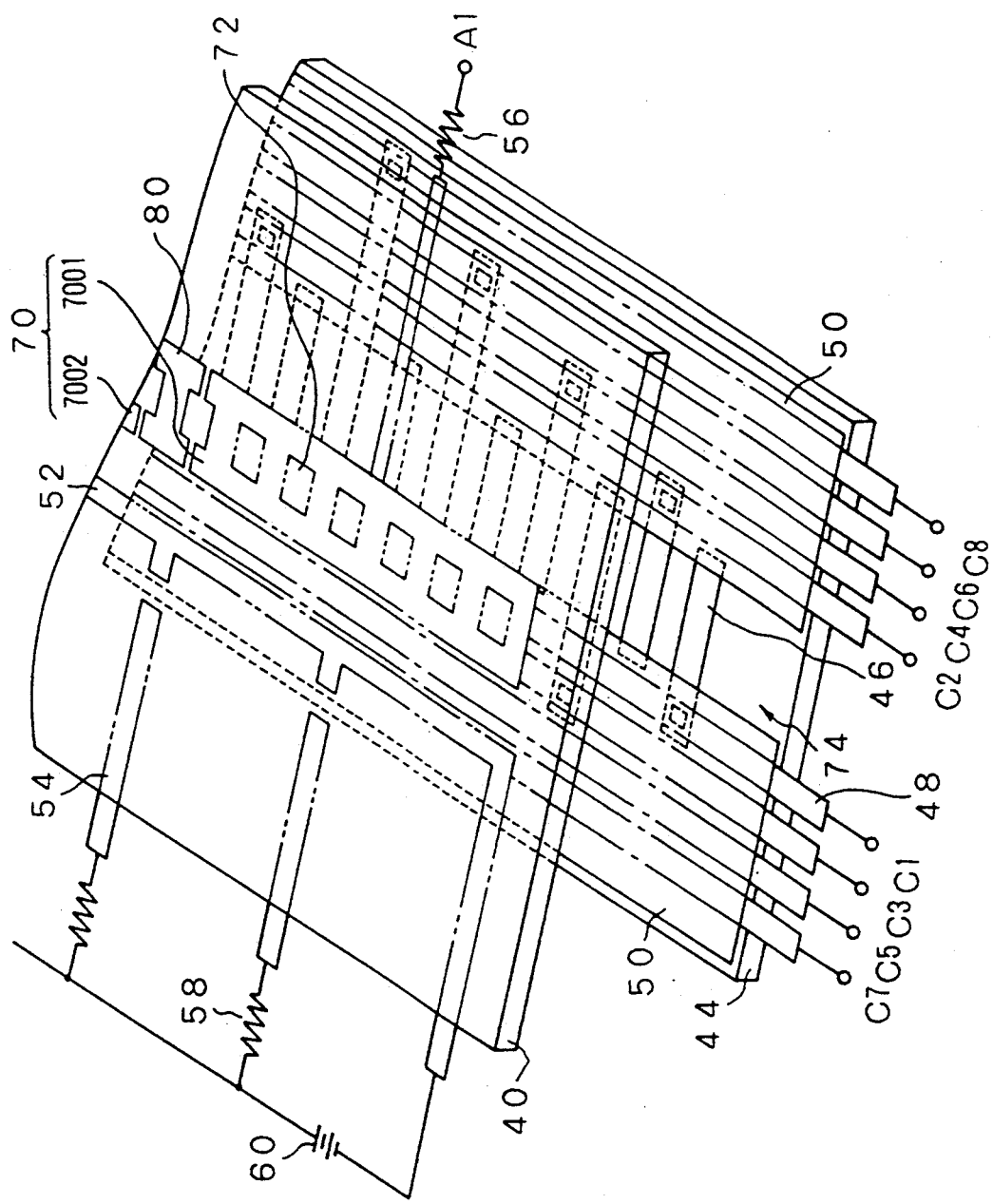
FIG. 30 is a fragmentary perspective view showing an embodiment of the invention applied to an optical print head as a gas discharge type light emission apparatus.
Figure 31:
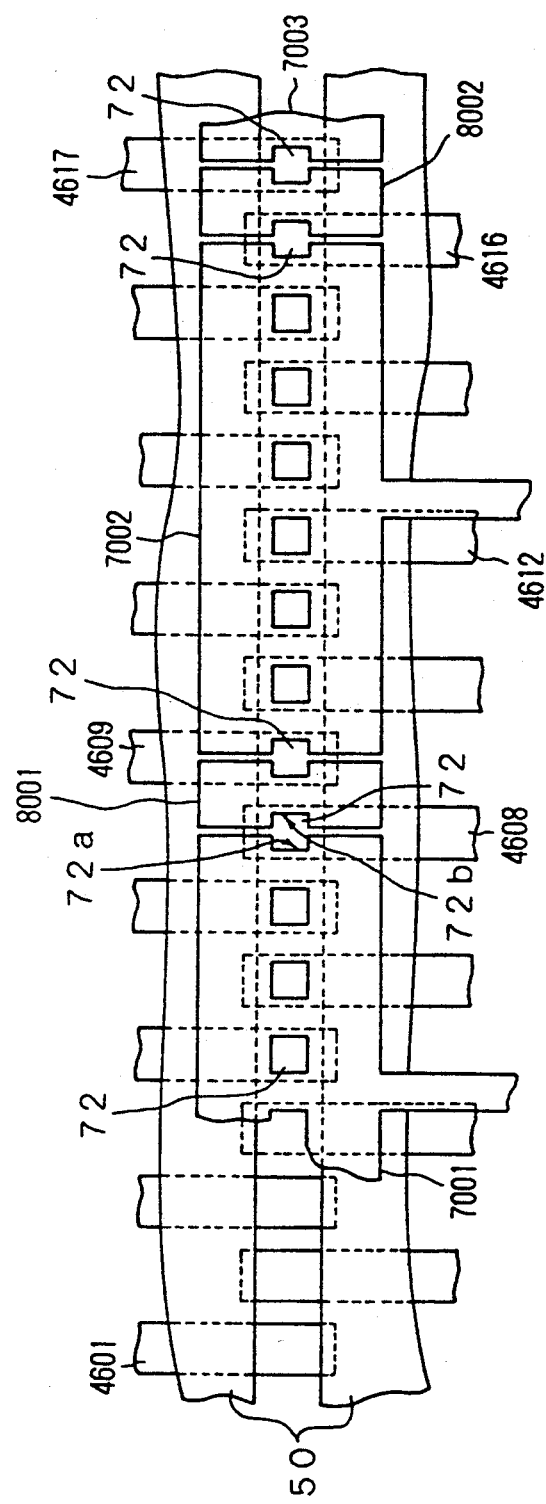
FIG. 31 is a fragmentary plan view showing an electrode structure of the optical print head shown in FIG. 30.

Referring to FIGS. 30 and 31, there is shown an optical print head, in which floating electrodes (generally designated at 80) are each provided between adjacent anodes 70 (for instance between anodes 7001 and 7002), thus sufficiently spacing apart, for instance, one anode 7001 and cathode 4609 facing the other anode 7002 adjacent to the anode 7001 for substantially eliminating erroneous discharge.

The anode 70 and floating electrodes 80 are made of a light-blocking material, and light emission windows (generally designated at 72) are formed in portions of the anodes 70 and floating electrodes 80 facing the cathodes (generally designated at 46).

In this case, the area of light emission window defined by the edge portions of the anode and floating electrode as well as the area of light emission windows formed in other portions of the anode is thought to be the area of exposed image of the cathode when the cathode is projected on the anode and floating electrode. These areas are suitably equal.

Again in this embodiment, each anode 70 is common to a suitable number, for instance 8, of cathodes 46, and discharge cells for optical writing are formed in areas, in which the anodes 70 and cathodes 46 face one another. In this example, a window 72 for a cathode 46 facing an anode end is formed by forming notches in opposed end portions of anode 70 and floating electrode 80 adjacent to each other. For example, the window 72 for the cathode 4608 is defined by notches 72a and 72b formed in the anode 7001 and adjacent floating electrode 80, respectively.

Figure 32:
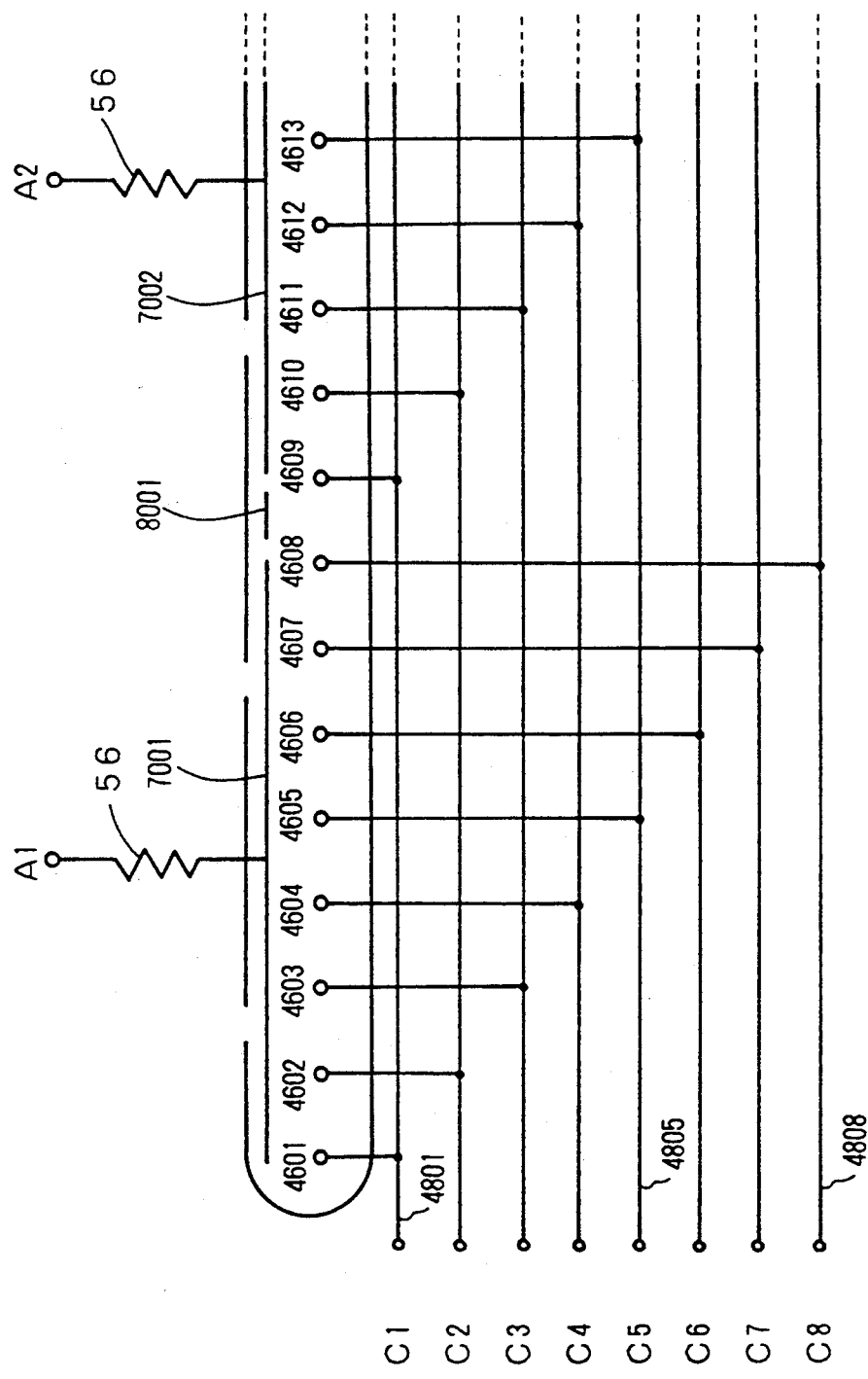
FIG. 32 is a view showing a wiring structure of the optical print head shown in FIG. 30.

Again in this embodiment, as shown in FIGS. 30 and 32, a plurality of cathodes 46 (i.e., cathodes 4601 and 4602, ... ) are provided on a rear substrate 44, and scanning electrodes 48 (or 4801, 4802, ... ) are provided in two groups each consisting of a suitable number of, for instance four, electrodes on each side of the array of cathodes 46, alternate cathodes 46 in the array having extensions connected to associated scanning electrode 48 on either side.

With this electrode structure, the optical print head can again be driven with data signals and scanning signals like those shown in the voltage application timing chart of FIG. 27.

For example, discharge in the discharge cells formed in the areas, in which the anodes 7001 and cathode 4601 to 4608 face one another, is controlled by the scanning signals C1 to C8 and data signal A1. Also, discharge in the discharge cells formed by the anode 7002 and cathodes 4609 to 4613 is controlled by the scanning signals C1 to C8 and data signal A2.

In this embodiment, as shown in FIGS. 31 and 32, two adjacent anodes, for instance 7001 and 7002, are provided such that they are sufficiently spaced apart from cathodes 4609 and 4608 belonging to the respective other anodes, thus eliminating crosstalk between the anode 7001 and cathode 4609 and between the anode 7002 and cathode 4608. Where adjacent anodes are sufficiently spaced apart in this way, it is liable that a light dot corresponding to anode end is increased in size and is obscure. Accordingly, in this embodiment floating electrode 8001 is provided between spaced-apart adjacent anodes 7001 and 7002, and end light emission windows 72 are formed by the floating electrode 8001 and anodes 7001 and 7002.

With this construction, it is possible to eliminate erroneous discharge during the operation of the optical print head, thus avoiding unnecessary optical writing that might otherwise result from erroneous discharge (or erroneous light emission).

Moreover, since the distance between one anode 70 and the closest cathode 46 in the other anode 70 to the first-mentioned anode 70 is set to a distance substantially free from erroneous discharge, even if the distance between one and other one of the adjacent anodes 70 is so large that practically sufficient light dot separation can not be obtained, practically sufficiently clear separation of light dots can be obtained with light-blocking floating electrodes 80 with windows 72. It is thus possible to obtain a high resolution optical head, with which light dots having a practically sufficiently clear shape can be obtained.

Further, with the distance between anode 70 and cathode 46 set such as to substantially eliminate erroneous discharge as noted above, there is no need of forming a partitioning member having a predetermined height between adjacent anodes 70. In addition, the anodes 70 and floating electrodes 80 can be readily formed. More specifically, the anodes 79 and floating electrodes 80 can be readily formed by forming an electrode layer of a light-blocking material on a substrate and then patterning this layer from forming the anodes 70 and floating electrodes 80.

Thus, with this embodiment it is possible to manufacture an optical head, which can eliminate erroneous discharge and practically sufficiently clearly separate light dots, with a high yield.

Figure 33:
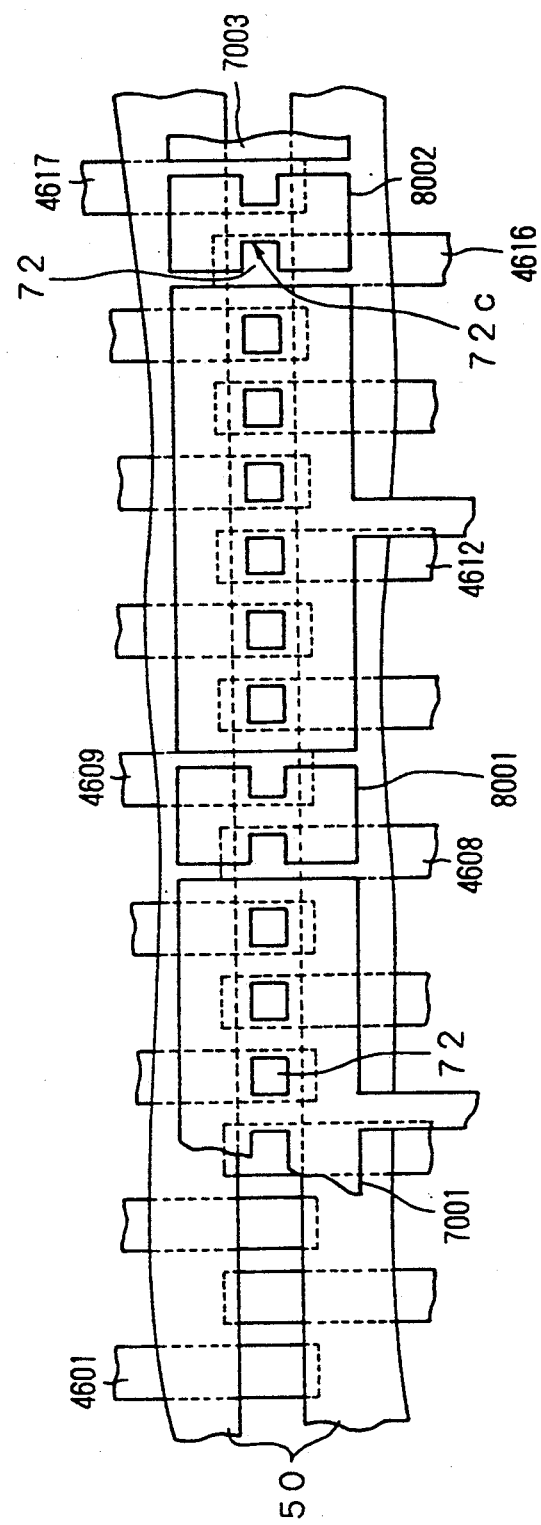
FIGS. 33 and 34 are fragmentary plan views showing modifications of the electrode structure of the optical print head shown in FIG. 30.

FIG. 33 is a fragmentary plan view similar to FIG. 31 but showing a modification of this embodiment. In the figure, parts like those in FIG. 31 are designated by like reference numerals, and a description of these parts is omitted hereinafter.

This modification in the same as the embodiment of FIG. 31 except for the manner of formation of light emission windows 72 for cathodes 46 facing anode ends.

In the modification of FIG. 33, light emission windows 72 for cathodes 46 facing anode ends are each formed by forming a notch in the floating electrode 80; for example, the window 72 for the cathode 4216 is constituted by a notch 72c formed in the floating electrode 8002.

With this modification, the same advantages as with the above embodiment can be obtained.

Figure 34:
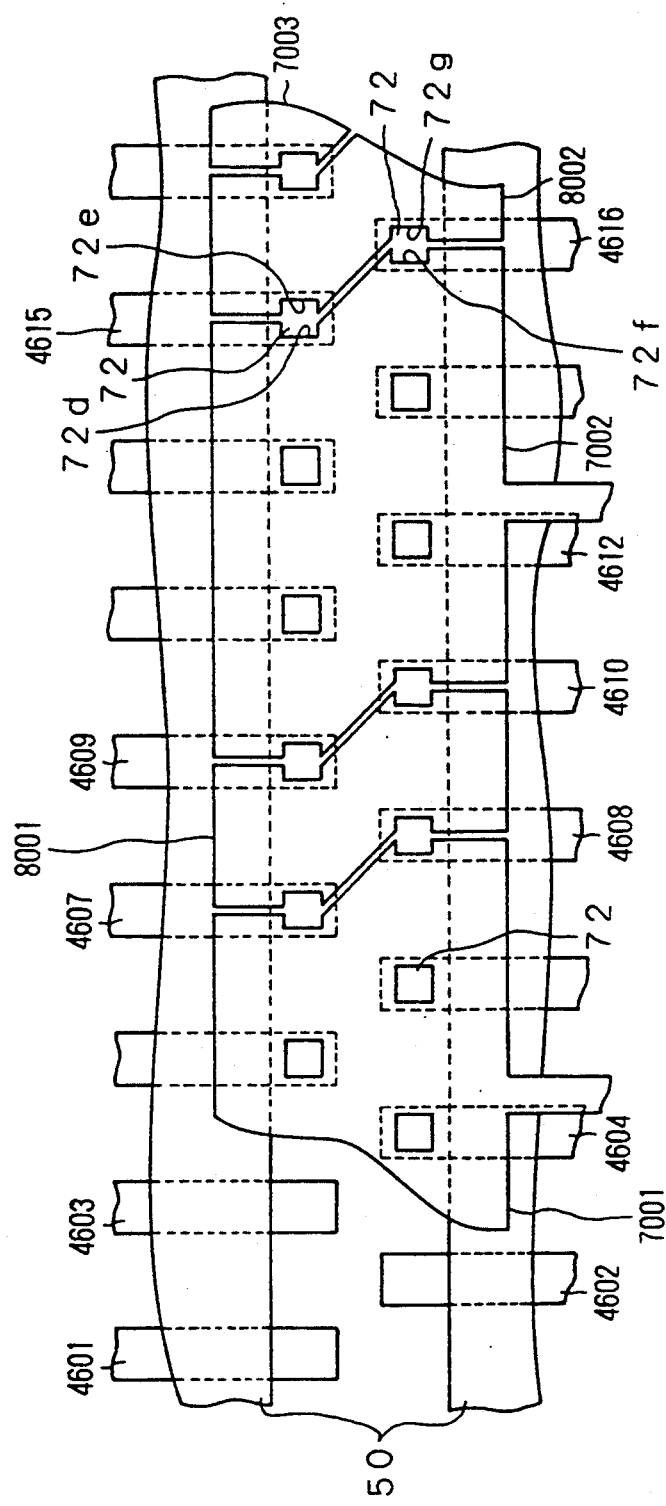

FIG. 34 shows a different modification of the embodiment of FIG. 31. Parts like those in FIG. 31 are designated by like reference numerals, and a description of the parts is hereinafter omitted.

The difference of this modification from the embodiment of FIG. 31 resides in that discharge cells for optically writing data are arranged in a staggered fashion.

More specifically, in this modification cathodes 46 are arranged in two spaced-apart rows of cathodes, with cathodes 4601, 4603, ... in one row being staggered with respect to cathodes 4602, 4604, ... in the other row. These cathodes 46 have their end portions exposed by light emission restriction layers 50 such that the exposed cathode portions are staggered in a zig-zag fashion.

The anodes 70 and floating electrodes 80, in plan view, partly cover the staggered exposed end portions of the cathodes 46. They are provided with light emission windows 72 formed in positions corresponding to the exposed portions of the cathodes 46.

The windows 72 for cathodes facing anode ends, like the embodiment shown in FIG. 31, are formed by forming notches in associated anodes 70 and floating electrodes 80. For example, the window 43 for the cathodes 4615 facing an end of the anode 7002 is formed by forming notches 72d and 72e in the anode 7002 and floating electrode 8002, respectively, and the window 43 for the cathode 4616 is formed by forming notches 72f and 72g in the anode 7002 and floating electrode 8002.

With this modification, the advantages of the embodiment of FIG. 31 can be obtained. Further, since the discharge cells are arranged in a staggered fashion, the discharge cell arrangement density can be increased compared to that in the embodiment of FIG. 31.

Further, with the electrode structures shown in FIGS. 30 to 34, the print head can be driven by the method described before in connection with FIGS. 12 to 14. For example, in the case of the optical print head having the electrode structure as shown in FIG. 31, there are two end light emission windows 72 formed by the floating electrode 8001 and opposite side anodes 7001 and 7002. In this case, subsequent to causing light emission through one of these two end light emission windows, light emission is caused through one or more other windows 72 than the other window before causing light emission through the other window 72.

The above embodiment is by no means limitative; for example, it is possible to suitably change the shape, position, size, material and method of formation of various components and method and numerical conditions of driving of optical head.

Further, this invention is applicable to gas discharge type optical heads having various structures as well as to the embodiment of optical head described above.

It is to be understood that with that gas discharge type optical head according to the invention the one of adjacent anodes and a cathode facing the other anode are spaced apart sufficiently to eliminate erroneous discharge. It is thus possible to avoid unnecessary optical writing due to erroneous light emission.

Moreover, since one of the adjacent anodes and cathodes facing the other anode are sufficiently spaced apart to substantially eliminate erroneous discharge, even if the distance between the two adjacent anodes is increased such that practically sufficient light dot separation can not be obtained, it is possible to obtain practically sufficient and clear separation of light dots with light-blocking floating electrodes having light emission windows. In addition, since the anodes are light-locking electrodes and are provided with light emission windows, it is possible to obtain a high resolution optical head, with which light dots having a practically sufficiently clear shape can be obtained.

Further, since one of the adjacent anodes and cathode facing the other anode are spaced apart sufficiently for practically eliminating erroneous discharge, there is no need of providing any partitioning member having a sufficient height for eliminating erroneous discharge between adjacent anodes. Furthermore, the anodes and floating electrodes can be readily formed.

It is thus possible to manufacture an optical head which can eliminate erroneous discharge and practically sufficiently clearly separate light dots.

Now, a driving method and arrangement of light emission windows will be described in connection with an electrode structure, in which each anode faces two or more cathodes arranged in two rows and the anodes are formed at positions to cathodes with light emission windows such that the windows are arranged in two rows, the windows in one row being staggered with respect to the windows in the other row. This embodiment will be described in the case when the electrode structure noted above is applied to an optical print head.

Figure 35:
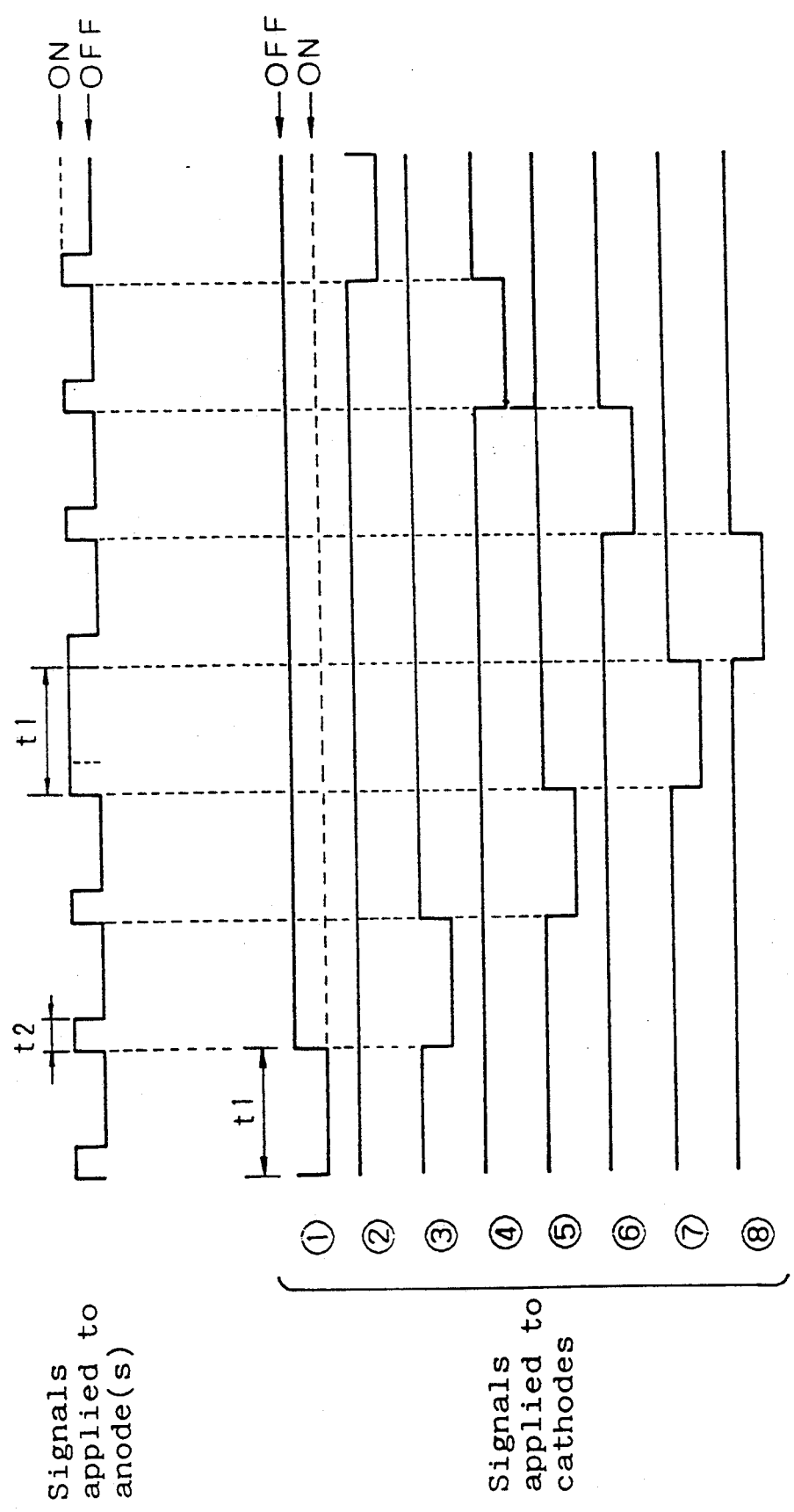
FIG. 35 is a timing chart for explaining a different method of driving according to the invention.

FIG. 35 is a time chart for explaining the embodiment, and it is similar to FIG. 10 so that like symbols used in FIG. 10 are used.

Figure 36:
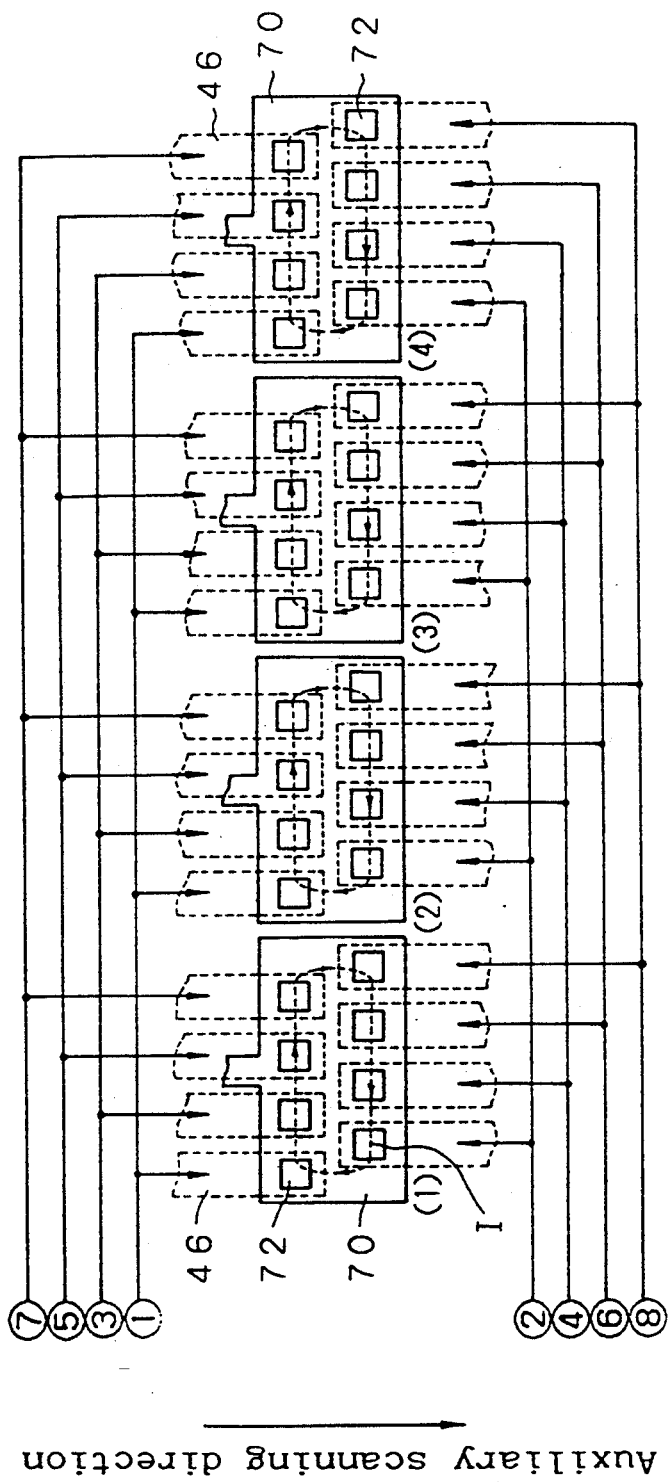
FIG. 36 is a fragmentary plan view showing a further example of an electrode structure of the optical print head adopting the gas discharge type light emission apparatus according to the invention.

FIG. 36 is a view similar to FIG. 9 but showing the electrode structure in the case of this embodiment, with light emission windows provided in anodes.

Figure 37:
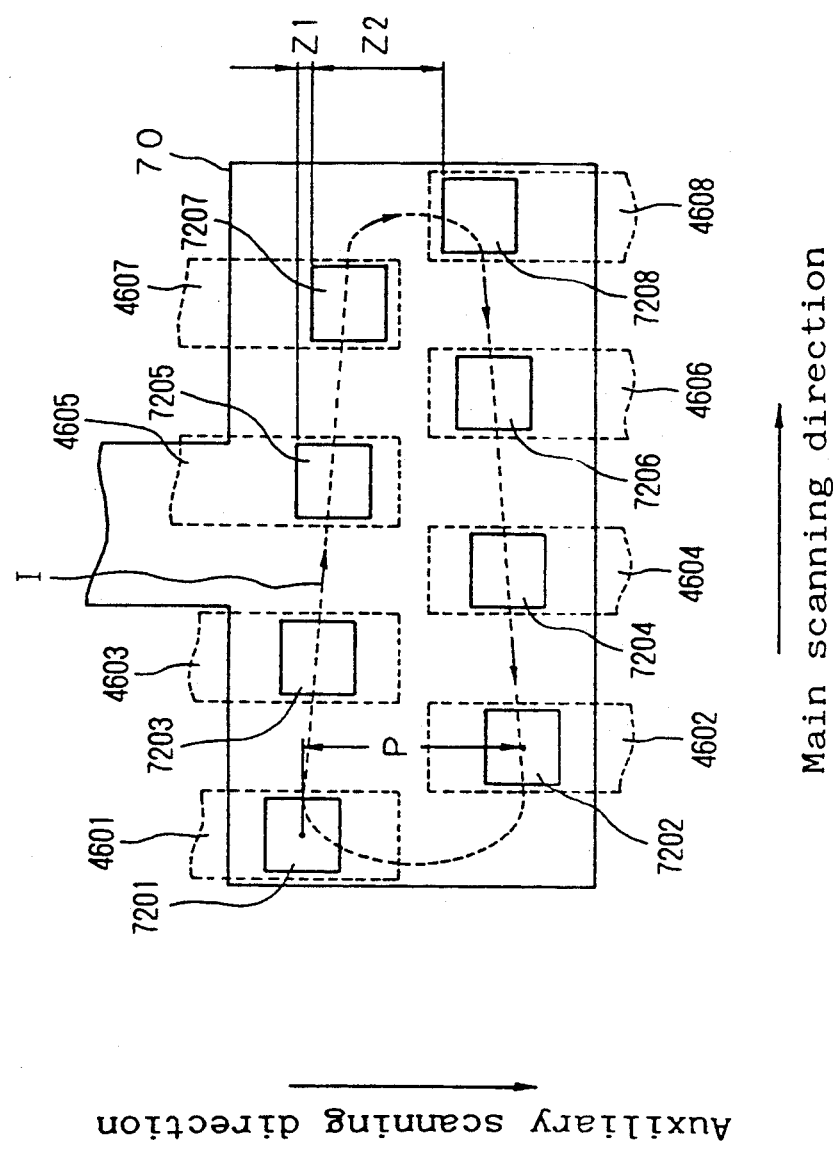
FIG. 37 is a fragmentary plan view showing an electrode structure for explaining a light emission window arrangement

FIG. 37 is a fragmentary plan view showing the electrode structure for explaining the arrangement of light emission windows.

First, a method of driving is described in the case where light emission windows are arranged in two rows, with the windows in one of the rows staggered with respect to those in the other row. The light emission windows are arranged in two rows either extending parallel to the main scanning direction of the optical print head in plan view of the anodes or such that distance between the two rows (.e., distance between light emission windows in two rows) becomes progressively smaller as one goes in the main scanning direction, as shown in FIG. 37. The embodiments is applied to either of these arrangements of light emission windows.

This embodiment, like the case of the prior art apparatus described before in connection with FIG. 10, adopts eight cathode eight division driving, and unit a "on" state, i.e., light emission pulse t1, of the scanning signals are applied successively to the cathodes. To the anodes 70, light emission pulses of data signals is applied in synchronism to voltage application to the cathodes (generally designated at 46) such that light emission is caused in only desired print cells (or discharge cells) Discharge light emission thus is caused in cells, in which light emission pulse t1 is simultaneously applied to anode 70 and cathode 46, typically the cell of anode 70 and cathode 4609. Light thus emitted is taken out through associated light take-out windows 72 (typically window 7207) to illuminate a photosensitive medium.

Further, slight light emission pulse t2 is applied to the anodes 70 at all time in synchronism to the voltage application to the cathodes 46, thus providing a priming effect for light emission without any auxiliary electrode.

In the instant driving method, the cathodes 46 are scanned in a loop fashion in the sequence of cathode groups ①, ③, ⑤, ⑦, ⑧, ⑥, ④, ②, and ① in the mentioned order.

Since slight light emission pulse t2 is applied to the anodes 70 in synchronism to the timings of the scanning of the cathodes 46 in a loop cycle sequence of cathode groups ①, ③, ⑤, ⑦, ⑧, ⑥, ④, ②, and ① in the mentioned order, discharge light emission for the duration of the slight light emission pulse t2 takes place in the successive print cells in a loop sequence (loop being shown by dashed arrows), thus providing a priming effect to the next print cell. The priming effect thus is shifted progressively from one to the other of adjacent print cells. This will further be described with reference to FIG. 36.

In this embodiment, when the light emission mode is set in print cell (1) - ①, for instance, but not in cell (2) - ①, that is, when light emission pulses are applied to the anode 70 of anode number (1) and also to the cathodes in the cathode group ① but no light emission pulse is applied to the anode 70 of anode number (2), that immediately preceding discharge light emission, if any, took place in the cell (1) - ②, which is sufficiently distant from the cell (2) - ① so that the cell (2) - ① never erroneously receives the priming effect.

Further, in this embodiment, the cell (2) - ② receives the priming effect from the cell (2) - ④ according to the sequence of scanning. That is, the cells (2) - ④ and (2) - ② are adjacent cells, and thus reliable priming effect shift between these cells can be obtained.

While the method of driving according to the invention is described above in connection with a plasma line head, this is by no means limitative, and the the method is applicable to a PDP as well.

Now the embodiment shown in FIG. 37 will be described.

The driving method in this case is like that in the case of the previous embodiment shown in FIG. 36. Further, in this case, light emitted from discharge cells of the gas discharge type light emission apparatus may illuminate a photosensitive medium or an original to be read out. Usually, such a medium or original is fed at a certain speed in a direction perpendicular to the direction of arrangement of anodes (and hence also arrangement of cathodes).

In this embodiment, light take-out windows 7201, 7202, . . . 7208 (generally designated at 72) are arranged with a distance step or ratio Z1 of Y/8, where Y is the product of the print interval in the auxiliary scanning direction B, i.e., scanning cycle time of the scanning signals, and the speed of the photosensitive medium or original. The value of the product Y represents the distance of relative movement of the medium or original relative to the light emission apparatus in one scanning cycle time.

In this embodiment, the light take-out windows 72 are arranged in two rows The minimum step Z2 between the two rows is, as shown in the FIG. 37, $(\frac{1}{8}+n) \times Y$, where n may be any positive integer, i.e., 0, 1, . . . .

While this embodiment adopts eight division driving as method of driving, in a general case of K division driving, the step between adjacent light take-out windows 72 is Y/K (where K is a natural number other than 1).

With this arrangement, the embodiment of FIG. 37 has the following function.

Since there is a time be&ween the timings of driving of the print cells (1) - ① and (1) - ③, the photosensitive medium or original is moved by Y/8 during this time, and in consequence a step of Y/8 is produced in the print result.

In the embodiment of FIG. 37 the light take-out windows 72 for the print cells (1) - ① and (1) - ③ are deviated in the auxiliary scanning direction B. Therefore, with the movement of the photosensitive medium or original the print line provided by the print cell (1) - ③ is displaced to be under the light take-out window 72 for the print cell (1) - ③ at the time of driving of this cell.

As has been shown, with the above embodiment, in which the anodes are provided with light emission windows arranged in two rows, with the windows in one row staggered with respect to the windows in the other row, the cathodes are scanned in a sequence looping the windows, the priming effect shift can be confined between adjacent cathodes.

It is thus possible to obtain a structure, in which the priming effect is prevented from being shifted in undesired directions and can also be reliably shifted adjacent light emission elements. This permits improvement of the display quality in a plasma display panel and improvement of the print quality in a plasma line head.

Further, in the above embodiment the light take-out windows in the plasma line head are arranged such that a step is provided in the auxiliary scanning direction by a unit "on" state time of a scanning signal divided by scanning cycle time thereof in the print interval in the auxiliary scanning direction, i.e., a distance covered by the photosensitive medium or original in the "on" state time of scanning signal, after another in the sequence of scanning of the cathodes. Thus, the print deviation due to movement of the photosensitive medium or original can be made up for.

It is thus possible to eliminate a print step in the main scanning direction and further improve the print quality in the plasma line head.

What is claimed is:

1. A method of driving a gas discharge type light emission apparatus which includes a plurality of electrode blocks arranged end-to-end in a line direction, the electrode blocks each including an anode and a plurality of cathodes, the plurality of cathodes confronting the anode via a discharge gas medium to form a plurality of discharge cell regions therebetween arranged in at least one row extending substantially parallel to the line direction, the cathodes at corresponding positions in each of said electrode blocks being commonly connected to each other through a respective one of a plurality of scanning electrodes, discharge light emission being selectively carried out in the plurality of discharge cell regions by applying data signals to the anode in each electrode block and scanning signals to respective cathodes of each electrode block via the scanning electrodes, wherein two electrode blocks having adjacent ends are denoted a first electrode block and a second electrode block, respectively, wherein a cathode of the first electrode block which is positioned at an end of the first electrode block adjacent the second electrode block is denoted a first cathode, and wherein a cathode of the second electrode block which is positioned at an end of the second electrode block adjacent the first electrode block is denoted a second cathode, said method comprising the steps of:

applying a scanning signal to one of the first and second cathodes; then applying at least one scanning signal to at least one of the plurality of cathodes other than the first and second cathodes; and then applying a scanning signal to the other of the first and second cathodes;

wherein said discharge cell regions of each electrode block are arranged in two rows which are offset relative to each other, and when cathodes corresponding to said two rows of discharge cell are regions scanned in a loop sequence by applying scanning signals to cathodes of one of said two rows sequentially in said line direction and then applying scanning signals to cathodes of the other of said two rows sequentially in a direction opposite to said line direction.

2. The method according to claim 1, wherein said anodes are formed of light-blocking material, wherein two rows of light transmission windows are formed in said anodes at positions corresponding to said discharge cell regions, wherein a linear distance between said two rows of light transmission windows becomes smaller along said line direction, and wherein a rate of reduction of said linear distance is equal to a distance over which a photosensitive medium exposed by light emitted from a discharge of the gas medium between said anodes and cathodes moves during a period of said scanning signals applied to said cathodes.

3. A method according to claim 2, wherein said gas discharge type light emission apparatus forms a light source of an optical print head.

4. A method according to claim 1, wherein said gas discharge type light emission apparatus forms a light source of an optical print head.

5. A gas discharge type light emission apparatus comprising a plurality of electrode blocks arranged end-to-end in a line direction, wherein each of said electrode blocks includes an anode and a plurality of cathodes confronting said anode via a discharge gas medium to form a plurality of discharge cell regions therebetween, said anode being formed of light-blocking material, said plurality of discharge cell regions of each electrodes block are arranged in at least one row extending parallel to said line direction, a plurality of light transmission windows are formed in said anode of each electrode block at positions respectively corresponding to said plurality of discharge cell regions, discharge light emission of said discharge cell regions is realized by applying voltages to said anode and said cathodes, and a light transmission window corresponding to a discharge cell region formed by a cathode confronting a vicinity between two adjacent anodes of two adjacent electrode blocks is substantially defined by opposed end portions of said two adjacent anodes.

6. The gas discharge type light emission apparatus according to claim 5, wherein said light transmission windows are square in shape, and wherein said light transmission window defined by said opposed end portions of said two adjacent anodes includes one side substantially defined by an end portion of one of said two adjacent anodes and three other sides substantially defined by an end portion of the other of said two adjacent anodes.

7. The gas discharge type light emission apparatus according to claim 5, wherein said light transmission window defined by said opposed end portions of said two adjacent anodes is square in shape, and wherein one half of said light transmission window is defined by the end portion of one of said two adjacent anodes, and the other half of said light transmission window is defined by the end portion of the other of said two adjacent anodes.

8. An optical print head comprising a light source constituted by the gas discharge type light emission apparatus according to claim 5.

9. The gas discharge type light emission apparatus according to claim 5, wherein an area of each cathode exposed by each respective light transmission window is the same for each of said light transmission windows including said light transmission window defined by said two adjacent anodes.

10. The gas discharge type light emission apparatus according to claim 5, wherein centers of areas of said cathodes exposed by said light transmission window are arranged at a uniform pitch.

11. An optical print head comprising a light source constituted by the gas discharge type light emission apparatus according to claim 10.

12. A gas discharge type light emission apparatus comprising a plurality of electrode blocks arranged end-to-end in a line direction, wherein each of said electrode blocks includes an anode and a plurality of cathodes confronting said anode via a discharge gas medium to form a plurality of discharge cell regions therebetween, said anode being formed of light-blocking material, said plurality of discharge cell regions of each electrode block are arranged in at least one row extending parallel to said line direction, a plurality of light transmission windows are formed in said anode of each electrode block at positions respectively corresponding to said plurality of discharge cell regions, discharge light emission of said discharge cell regions is realized by applying voltages to said anode and said cathodes, a floating electrode is interposed between two adjacent anodes of adjacent electrode blocks, and first and second light transmission windows corresponding to respective discharge cell regions formed by first and second cathodes confronting a vicinity between said floating electrode and each adjacent anode are substantially respectively defined by opposed end portions of said floating electrode and each adjacent anode.

13. The gas discharge type light emission apparatus according to claim 12, wherein said light transmission windows are square in shape, and wherein each of said first and second light transmission windows defined by said opposed end portions includes one side substantially defined by the end portion of one of an adjacent anode and said floating electrode and three other sides substantially defined by the end portion of the other of said adjacent anode and said floating electrode.

14. The gas discharge type light emission apparatus according to claim 12, wherein one half of each of said first and second light transmission windows is defined by opposed end portions.

15. An optical print head comprising a light source constituted by the gas discharge type light emission apparatus according to claim 12.

16. The gas discharge type light emission apparatus according to claim 12, wherein an area of each cathode exposed by each respective light transmission window is the same for each of said light transmission windows including said first and second light transmission windows.

17. The gas discharge type light emission apparatus according to claim 12, wherein centers of areas of said cathodes exposed by said light transmission window are arranged at a uniform pitch.

* * * * *